United States Patent
Horen et al.

(10) Patent No.: US 12,182,840 B2
(45) Date of Patent: Dec. 31, 2024

(54) SYSTEM AND METHOD OF MATCHING A SELLER OF A VEHICLE TO A BUYER OF A VEHICLE

(71) Applicant: BacklotCars, Inc., Kansas City, MO (US)

(72) Inventors: David Horen, Kansas City, MO (US); Daniel Duncan, Kansas City, MO (US); Jason Houseworth, Olathe, KS (US)

(73) Assignee: BacklotCars, Inc., Kansas City, MO (US)

( * ) Notice: Subject to any disclaimer, the term of this patent is extended or adjusted under 35 U.S.C. 154(b) by 249 days.

(21) Appl. No.: 17/400,539

(22) Filed: Aug. 12, 2021

(65) Prior Publication Data

US 2022/0051304 A1   Feb. 17, 2022

Related U.S. Application Data

(60) Provisional application No. 63/064,520, filed on Aug. 12, 2020.

(51) Int. Cl.
*G06Q 30/0601* (2023.01)
*G06F 3/0482* (2013.01)
(Continued)

(52) U.S. Cl.
CPC ......... *G06Q 30/0617* (2013.01); *G06F 9/451* (2018.02); *G06Q 30/018* (2013.01); *G06Q 30/0206* (2013.01); *G06Q 30/0235* (2013.01); *G06Q 30/0623* (2013.01); *G06Q 30/0631* (2013.01); *G06Q 30/0633* (2013.01); *G06Q 30/0641* (2013.01); *G06F 3/0482* (2013.01); *G06F 3/04847* (2013.01)

(58) Field of Classification Search
CPC ............. G06Q 30/0617; G06Q 30/018; G06Q 30/0206; G06Q 30/0235; G06Q 30/0623; G06Q 30/0631; G06Q 30/0633; G06Q 30/0641; G06F 9/451
USPC ................................ 705/80, 26.4, 26.9, 26.8
See application file for complete search history.

(56) References Cited

U.S. PATENT DOCUMENTS

| 8,095,422 B2 | 1/2012 | Hallowell et al. |
| 8,230,362 B2 | 7/2012 | Couch |

(Continued)

FOREIGN PATENT DOCUMENTS

| WO | WO-2005033971 A1 * | 4/2005 | ........... G06F 16/951 |
| WO | WO-2018039728 A1 * | 3/2018 | ......... G06Q 30/0609 |

OTHER PUBLICATIONS

Onecause, 13 Silent Auction Strategies: The Ultimate Guide for Nonprofits, 2020 (Year: 2020).*

*Primary Examiner* — Tarek Elchanti
(74) *Attorney, Agent, or Firm* — Lempia Summerfield Katz LLC

(57) ABSTRACT

Systems, methods, and media for matching a seller of a vehicle with a buyer of a vehicle in a dealer-to-dealer transaction are described. Information indicative of a vehicle may be obtained from the seller of the vehicle. The vehicle may be matched with a buyer based at least in part on information associated with the buyer and information indicative of the vehicle. Bid offers may be presented to the seller on behalf of the buyer. When a vehicle price is agreed upon, a financial transaction and transportation of the vehicle may be facilitated by the matching system.

22 Claims, 13 Drawing Sheets

(51) Int. Cl.
  *G06F 3/04847* (2022.01)
  *G06F 9/451* (2018.01)
  *G06Q 30/018* (2023.01)
  *G06Q 30/0201* (2023.01)
  *G06Q 30/0235* (2023.01)

(56) References Cited

U.S. PATENT DOCUMENTS

| | | |
|---|---|---|
| 8,315,921 B2 | 11/2012 | Hallowell et al. |
| 9,189,615 B2 | 11/2015 | Tumanyan |
| 10,692,122 B2 | 6/2020 | Esposito et al. |
| 2010/0312665 A1* | 12/2010 | Bundy ............... G06Q 30/0633 705/26.8 |
| 2014/0358725 A1* | 12/2014 | Afaq .................. G06Q 30/0639 705/26.9 |
| 2016/0071177 A1* | 3/2016 | Launay ............. G06Q 30/0611 705/26.4 |
| 2016/0335714 A1* | 11/2016 | Geetha ............... G06Q 30/0283 |
| 2017/0103349 A1* | 4/2017 | Ersergin ................ G06Q 50/12 |
| 2019/0139098 A1* | 5/2019 | Margiolas .............. G06N 20/00 |

\* cited by examiner

SYSTEM AND METHOD OF MATCHING A SELLER OF A VEHICLE TO A BUYER OF A VEHICLE

RELATED APPLICATION

This non-provisional application claims the benefit of U.S. Provisional Patent Application No. 63/064,520, filed Aug. 12, 2020, and entitled "SYSTEM AND METHOD OF MATCHING A SELLER OF A VEHICLE TO A BUYER OF A VEHICLE IN A DEALER-TO-DEALER TRANSACTION," the entirety of which is incorporated by reference herein.

BACKGROUND

1. Field

Embodiments of the invention relate to matching automobile sellers and buyers. More specifically, embodiments of the invention relate to providing a fully automated automobile recommendation system and method to match sellers and buyers for dealer-to-dealer transactions.

2. Related Art

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Typically, automobile dealers seeking new pre-owned inventory either communicate directly with other dealers to purchase vehicles from other lots or go through auctions or intermediary retailers. For example, a seller may receive a vehicle on trade-in that is not consistent with the seller's inventory. The seller may list the vehicle on the dealer website and other auction sites that other dealers (buyers) may visit in search of vehicles to fill the buyer lots. What is needed is a system and method that facilitates the process of listing, purchasing, and transporting vehicles for sale and optimizes the process between sellers and buyers.

SUMMARY

Embodiments of the invention address the above-described need by providing for a variety of techniques for matching sellers and buyers of vehicles in dealer-to-dealer transactions. In particular, a first embodiment of the invention is directed to a method of matching a seller and a buyer of a vehicle in a dealer-to-dealer transaction, the method comprising the steps of receiving, from the seller of the vehicle, information indicative of the vehicle, listing the information indicative of the vehicle on a website, presenting the vehicle to the buyer based on buyer information, automatically generating an offer from the buyer based on the buyer information, and presenting the offer for the vehicle to the seller, wherein the seller and the buyer are vehicle dealers.

A second embodiment of the invention is directed to a method of matching a seller and a buyer of a vehicle in a dealer-to-dealer transaction, the method comprising the steps of receiving, from the seller of the vehicle, information indicative of the vehicle, listing the information indicative of the vehicle on a website, presenting the vehicle to the buyer based on buyer information, generating recommendations for offers for the vehicle for the buyer, and presenting the offer for the vehicle to the seller.

A third embodiment of the invention is directed to one or more non-transitory computer-readable media storing computer executable instructions that, when executed by at least one processor, performs a method of matching a seller of a vehicle to a buyer of the vehicle, the method comprising the steps of receiving, by a seller interface and from the seller of the vehicle, information indicative of the vehicle, presenting, by a buyer interface and to the buyer of the vehicle, the vehicle to the buyer based on buyer information and the information indicative of the vehicle, receiving, by the buyer interface, an offer for the vehicle from the buyer, presenting, by the seller interface, the offer for the vehicle to the seller, and facilitating the purchase of the vehicle, wherein the buyer and the seller are vehicle dealers.

A fourth embodiment includes a method and apparatus for notifying one or both of buyers or a seller regarding a vehicle for sale. The method and apparatus includes: responsive to the triggering event and in real time: accessing information indicative of one or more vehicle factors of interest to one or more buyers and to the seller; determining, based on the accessed information, at least one buyer whose associated one or more vehicle factors matches one or more factors associated with the vehicle; and responsive to determining that the at least one buyer whose associated one or more vehicle factors matches the one or more factors associated with the vehicle, in real time, generating one or more GUIs and sending the one or more GUIs to facilitate the sale between the seller and the at least one buyer, the one or more GUIs comprising notification including an indication of a plurality of attributes of the vehicle and an indication of the associated one or more vehicle factors.

A fifth embodiment includes a method and apparatus for configuring and at least partly automatic purchasing of vehicles. The method and system include: generate and send one or more GUIs for transmission to one or both of a seller or a buyer, the one or more GUIs indicative of soliciting input from the one or both of the seller or the buyer in configuring automatic operation during at least two of the following stages of auction of the vehicle: at a beginning of the auction; during the auction; closing the auction; responsive to sending the one or more GUIs, receive input regarding configuring automatic operation during at least two of the following stages of auction of the vehicle: at a beginning of the auction; during the auction; closing the auction; receive a trigger for sale of a specific vehicle; and responsive to receiving the trigger, perform automatic operation, based on the input, during at least two of the following stages of auction of the vehicle.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

The present application is further described in the detailed description which follows, in reference to the noted drawings by way of non-limiting examples of exemplary implementation, in which like reference numerals represent similar parts throughout the several views of the drawings, and wherein.

Figure 1:
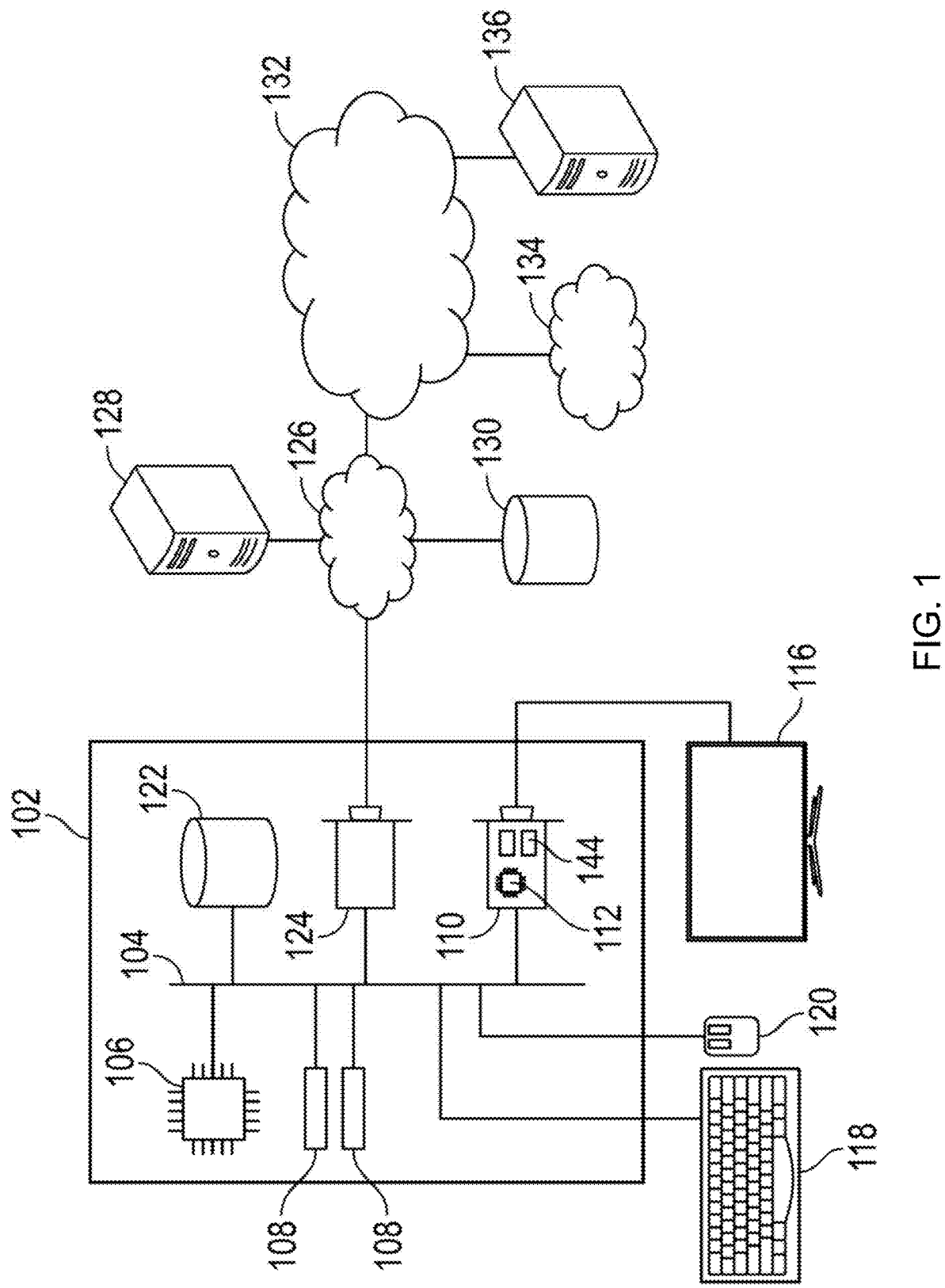
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

Embodiments of the invention solve the above-described problems and provide a distinct advance in the art by providing a method and system for matching automobile dealer buyers and sellers. Broadly, a matching system is provided that facilitates the interaction of a seller and a buyer to purchase and relocate vehicles.

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Broadly, embodiments of the invention provide systems and methods of facilitating the purchase and delivery of automobiles between automobile dealers. In some embodiments, the matching system obtains information from the dealers to optimize the process of matching sellers, vehicles, and buyers. The matching system may obtain data such as, for example, dealer preferences, dealer inventory, location, website data, historical data, vehicle data, and any other data that may be used to match the dealer buyers and sellers. The data may be stored in a matcher database and accessed to analyze for matching. Any statistical and machine learning algorithms may be utilized to analyze the data as described in embodiments herein. Recommendations may be provided to the dealers for vehicles that may meet the dealers' preferences. In some embodiments, the matching system automatically generates listings, promotions, and offers for vehicles. In some embodiments, the matching system facilitates transactions and transportation of the vehicles from a seller to a buyer.

The matching system may be used by the seller and/or the buyer at various stages in the sale of the vehicle, including any one, any combination, or all of: prior to listing of the vehicle; during the listing of the vehicle (e.g., during an auction); or after listing of the vehicle. As discussed in more detail below, the matching system may be configured to perform one or more actions, such as any one, any combination, or all of:

(i) generating recommendations as to action(s) to perform (e.g., any one, any combination, or all of: recommend to the seller to list the vehicle; recommend to the seller to remove the listing of the vehicle; recommend to the seller to re-list the vehicle; recommend to the buyer to submit a bid; recommend to the seller and/or buyer to submit a counter-offer; recommend to the seller to offer a limited-time offer; recommend to the buyer to accept or reject the limited-time offer; recommend to the seller to close the auction of the vehicle; etc.);

(ii) generating price recommendations in support of the recommended action(s) (e.g., any one, any combination, or all of: recommend to the seller prices associated with listing the vehicle (such as one or both of initial list price and floor price); recommend buy-it-now (BIN) price(s); recommend to the buyer initial bids; recommend to the seller and/or the buyer counter-offers; etc.); and (iii) generating recommendations as to when to perform the recommended action(s) (e.g., any one, any combination, or all of: recommend to the seller when to list a vehicle; recommend to the seller when to withdraw the listing a vehicle; recommend to the seller when to re-list a vehicle; recommend to the buyer when to submit an initial bid for a vehicle; recommend to the seller and/or the buyer when to submit a counter-offer for a vehicle; recommend to the seller when to post a BIN price for a vehicle; recommend to the seller when to revise a BIN price for a vehicle; recommend to the seller when to close an auction for a vehicle; etc.)

The matching system may use one or more factors in order to generate the recommendations action(s), the price recommendations in support of the recommended action(s); and/or the timing of performing the recommendations action (s). Various factors include any one, any combination, or all of: current market price; potential profit; time-to-sale; vehicle inspection information; transportation cost; time(s) associated with the listing (e.g., any one, any combination, or all of: the elapsed time since the vehicle has been listed; the elapsed time since the de-listing for the vehicle; the elapsed time since the vehicle has been re-listed; the elapsed time from listing or re-listing until submission of the first bid; number of times the vehicle has been relisted; frequency of bidding; elapsed time in between bids); seller factors (e.g., location of the seller); or buyer factors (e.g., location of the buyer).

As discussed in more detail below, the matching system may work in combination with one or more other systems, such as Autopilot. In particular, Autopilot may be configured to automatically perform one or action, such as any one, any combination, or all of the actions recommended (including the timing of performing the recommended actions) by the matching system discussed herein and/or may be configured to notify the seller and/or buyer of the actions recommend and solicit input from the seller and/or buyer. Thus, in one or some embodiments, Autopilot, working in combination with the matching system, may generate and send one or more GUIs to solicit input from the buyer and/or seller (e.g., the GUIs may include icons or links which a user may activate to indicate authorization to perform the recommended action; responsive to receive of the authorization, Autopilot is configured to perform the recommended action. Alternatively, or in addition, the GUIs may include timers that may countdown, thereby indicating the limitation nature of the recommended actions).

In some embodiments, the matching system may comprise a dealer management tool for allowing the seller to manage the vehicle from trade-in to sell. The vehicle information may be tracked, edited, and customized. The vehicle information may be input upon acquisition and any modifications to the information may be added and edited. Vehicle inspection data may be added to the vehicle information file as well as all inputs, analytics data, and price and buyer recommendations described herein. The dealer management tool may provide a central location for all dealer management operations such as, for example, inventory, maintenance, financial transactions, financing options, staff and administration profiles, customer profiles, and connections between sellers and buyers.

Figure 13:
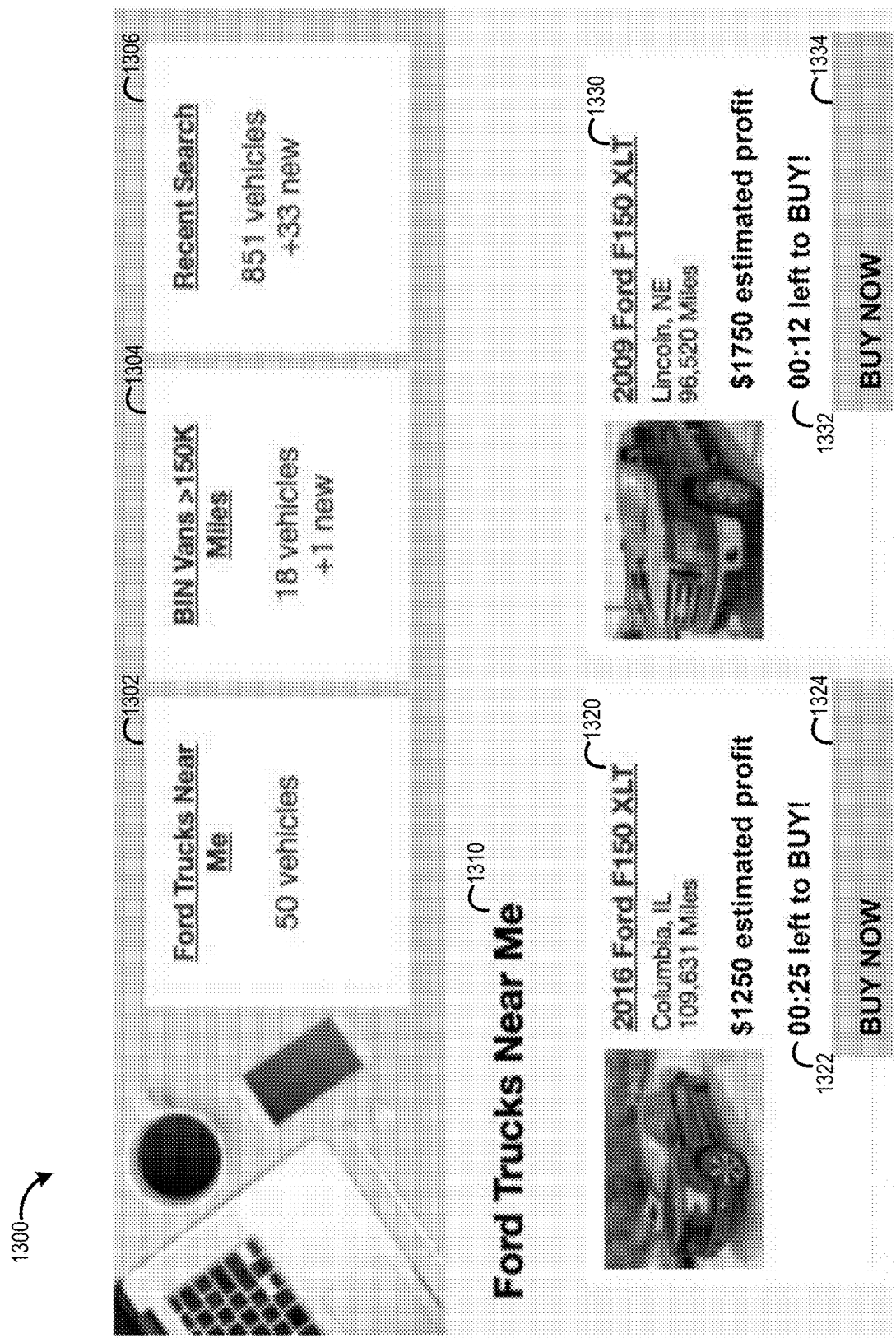
FIG. 13 is a second example GUI in which a buyer is presented with limited-time offers for vehicles.

In one or some embodiments, the system is configured for automatic operation at any one, any combination, or all stages of the sale of the vehicle. Further, the system enables the seller and/or the buyer to instruct the system as to which stages are subject to automatic operation and which stages are contingent on manual input from the respective seller or buyer. In this way, the seller and/or buyer may tailor the system to different gradations of control. In particular, the buyer or seller may configure automatic features for one or more stages associated with the sale of the vehicle, such as any one, any combination, or all of: prior to the sale of the vehicle (e.g., automatically setting initial asking price and/or initial purchase price and/or automatically determining when to list a respective vehicle for sale); during the sale of the vehicle (e.g., automatically setting counter-offers for the seller and/or the buyer; automatically setting the timing as to sending the counter-offers); at the closing of the sale of the vehicle (e.g., automatically determining when to close the auction; automatically determining under what terms to close); or limited offers pre- or post-closing (e.g., selecting a subset of buyers in which to provide a limited-time offer to purchase the vehicle in the event that the vehicle has not sold during the allotted time). In this way, a respective seller or a respective buyer may tailor the automatic features to his/her particular interests. Further, in one embodiment, the automatic configuration may be set to "yes" (enabling the system to perform the task, such as generating initial sell/buy prices automatically) or "no" (with the system requiring user input). Alternatively, the automatic configuration may include one or more other factors in order for the system to perform the task automatically. Example factors may include a time aspect (e.g., performing the task automatically for a designated limited amount of time; after which, the seller or buyer is prompted by the system to input the decision); a cost aspect; a numerical aspect; etc. As one example regarding the cost aspect, the system may perform the task automatically until a designated cost amount is reached, after which, the seller or buyer is requested to provide input (e.g., a buyer may designate that the system may automatically spend at most a total of $Y in the designated period (such as one week); after which, the system presents recommended vehicles to the buyer to purchase and requests that the buyer make the decisions whether to purchase a respective vehicle). As another example regarding the cost aspect, the system may perform the task automatically for different groupings of vehicles and for different total spend amounts In particular, a buyer may designate that the system automatically spends: at most a total of $A for Ford trucks within 50 miles in the designated period and at most a total of $B for BIN vans with greater than 150K miles in the designated period. After which, the buyer may be prompted for decisions whether to purchase, such as in one or more GUIs. For example, FIG. 13 illustrates an example of presenting limited time offers in a designated category to the buyer. Thus, the buyer may configure an automatic-manual hybrid system of purchasing vehicles tailored to the respective buyer's specific interests both in terms of automatic purchasing and of automatic generation of GUIs to request manual input.

Further, in support of performing the one or more automatic actions, the system may analyze one or more factors in order to assess the marketplace, and in turn, determine what automatic action(s) to perform (and optionally when to perform them). The analysis may be performed from the perspective of the seller in order to determine whether and/or how to perform various actions, such as whether to list a vehicle for sale (and optionally the various prices associate with the listing, including one or both of the initial bid price and/or the floor price), whether to notify to a subset of buyers and which subset of buyers to notify (e.g., the system may offer limited time offers at various stages, such as prior to general listing of the vehicle, and/or at or after closing; depending on system analysis, the system may determine to generate the limited time offer to the subset of buyers, with the selection of the subset of buyers based on input from the buyers (indicating buyer interest) and/or attributes associated with the buyers); whether to accept an offer or to counter offer; or whether to close the auction. The system may analyze various factors, discussed below, in order to determine whether and/or how to perform the various actions. (e.g., by analyzing prospective bidders prior to the start of the auction; by analyzing actions current bidders during the auction (such as the number of bids, the frequency of the bids, the number of bidders, etc.) and/or by analyzing prospective bidders after the close of the auction). In this regard, the analysis may be a quantitative assessment of the marketplace based on the factors discussed herein, and in turn, determine whether and what actions to perform based on the qualitative assessment.

Alternatively, or in addition, the analysis may be performed from the perspective of the buyer in order to determine whether and/or how to perform various actions, such as whether to submit an offer (and how much to offer) or whether to submit a counter-offer. Again, the analysis on behalf of the buyer may be a quantitative assessment of the marketplace based on the factors discussed herein, and in turn, determine whether and what actions to perform based on the qualitative assessment.

As one example regarding the numerical aspect, the system may perform the task automatically until a designated numerical amount is reached, after which, the seller or buyer is requested to provide input (e.g., a buyer may designate that the system may automatically purchase at most Z number of cars in the designated period; after which, the system presents recommended vehicles to the buyer to purchase and requests that the buyer make the decisions whether to purchase a respective vehicle). As another example regarding the numerical aspect, the system may perform the task automatically for different groupings of vehicles and for different total numerical amounts (e.g., a buyer designates that the system automatically spends: at most a total of C number of vehicles for Ford trucks within 50 miles in the designated period; at most a total of D number of vehicles for BIN vans with greater than 150K miles in the designated period; after which, the buyer is prompted for decisions whether to purchase).

By way of example, on the seller side, the system may automatically generate one or more prices, such as initial prices (e.g., the asking price and/or the floor price), and may then immediately use the initial prices (e.g., for programmatic/automatic buying, discussed below or for the asking price when listing the vehicle on the website) or may use the initial prices only responsive to seller approval (e.g., the system may send, in real-time or near real-time the automatically generated initial prices and await approval from the seller). Alternatively, or in addition, the system may automatically determine a time at which to offer the vehicle for sale. As another example, on the buyer side, the system may automatically generate purchase prices at which to purchase vehicles. Again, the system may immediately implement the automatically generated purchase prices (e.g., such as for programmatic/automatic buying, discussed further below) or may use the automatically generated purchase prices only responsive to buyer approval.

Alternatively, or in addition, the system may perform one or more automatic actions during the sale of a vehicle, such as one or more automatic tasks associated with negotiations for the buyer and/or the seller (e.g., what and/or when to counter-offer). In particular, on the seller side, the system may determine the buy-it-now (BIN) price (which is a price at which a buyer may immediately purchase the vehicle without further negotiation and is interchange with the terms "ask price" or "asking price") and/or the time at which to offer the BIN price.

Alternatively, or in addition, the system may perform one or more automatic actions associated with the closing, including determining whether to close (e.g., whether to only consider bids in the present auction or consider multiple auctions, such as cost averaging) and/or when to close (e.g., analyzing one or more triggers to determine when to close, including automatically closing above target price and/or floor price).

The automatic aspects may be integrated within multiple layers of precedence for purchase. As discussed further below, the offers for a respective vehicle may be dependent on an order of priority. In one or some embodiments, the order of priority may comprise (in order of precedence): (i) fully programmatic/automatic buying (e.g., the system automatically arranges for a seller to sell a vehicle to a buyer without any real-time input from the buyer or the seller); (ii) recommended buying (e.g., the system automatically provides a respective buyer with one or more time-limited recommendations to buy certain vehicles and awaits the buyer's input prior to executing the sale); (iii) buyers with access to certain auction outlets (e.g., the system automatically lists the vehicle on select websites with potential login requirements, such as the ADESA website or the Openlane website); and then (iv) general auction website listing. In this way, buyers may tailor buying to one or more of the options presented above. As one example, a buyer may buy based on (i) and (ii), with the buyer instructing the system to perform programmatic/automatic, thereby purchasing up to a predetermined limit (such as fully automatically purchasing, without any buyer input, a certain number of vehicles and/or a certain total dollar amount), after which the buyer may be automatically contacted with limited-time offers for vehicles selected based on the buyer's desired features.

With regard to (ii), the system may automatically present the buyer with offers of vehicles that are time-limited. In one or some embodiments, the system, without any explicit input from the buyer, may determine which vehicles to select for the time-limited offers. As discussed above, the system may select the respective buyer based on analysis of one or more attributes of the respective buyer (e.g., the system analyzes previous vehicles purchased by the respective buyer to determine common attributes of interest to the respective buyer). Alternatively, or in addition, the buyer may provide one or more factors in selecting the vehicles for the time-limited offers. Example factors may include any one, any combination, or all of: make; model; year; type of vehicle (e.g., sedan, truck, SUV); qualitative condition of vehicle (e.g., pristine, poor, junk); distance from buyer (e.g., within 50 miles); options on vehicle (e.g., navigation system); wear of vehicle (e.g., vehicles with over 100K miles drive); type of offer (e.g., auction or BIN); etc. In this way, the system may select, based on input from the buyer, as to the vehicles to present to the buyer for time-limited offers. Thus, the system may select the respective buyer based on the input from the respective buyer himself/herself and/or based on analysis of one or more attributes of the respective buyer. Further, the presentation, in the form of one or more GUIs, may display the vehicles. As one example, the buyer may indicate an interest in vehicles with one or more specific factors (e.g., as discussed below in FIG. 13, three factors including the make, such as Ford, the type of vehicle, such as truck, and the distance from the buyer (such as less than 50 miles away)). Given this input, the system may periodically (e.g., responsive to a real time trigger such as an input of an inspection report) update the one or more GUIs to the buyer. In this way, the buyer may dynamically receive GUI updates tailored to the buyer's preferences.

In one or some embodiments, the one or more GUIs that display vehicles responsive to the buyer's preferences may further include an indication of the time-limited nature of the offer, such as a clock, a countdown clock or the like. In this way, the buyer may view in a same GUI or different GUIs the vehicles, in real-time, that are tailored to the buyer's preferences and also may view the time-limited offers for the respective vehicles (e.g., each vehicle subject to the time-limited offer may have its own associated count-down clock such that different vehicles offered in the same GUI may have different count-down clock times).

As discussed above, the system may be configured for automatic selling and/or automatic buying. In the embodiment in which the system is configured for both automatic selling and automatic buying, the system is configured to independently execute at least some of the automatic aspects for the seller and buyer. For example, the automatic aspects of determining one or more prices for the seller (such as the initial asking price and/or the counter-offer) and of determining one or more prices for the buyer (such as the initial purchase price and/or the counter-offer) may be independent of one another. In one particular case, one independently executed portion of the methodology may automatically generate an asking price (on behalf of the seller) for a respective vehicle, and another independently executed portion of the methodology may automatically generate the buy price (on behalf of the buyer) for the respective vehicle. In another particular case, one independently executed portion of the methodology may automatically determine whether to accept a buyer offer or generate a counter-offer (on behalf of the seller) for a respective vehicle, and another independently executed portion of the methodology may automatically determine whether to accept the counter-offer from the seller or generate another counter-offer (on behalf of the buyer) for the respective vehicle. In this way, the system, in determining whether (and what) action to take on behalf of the seller may analyze data other than private buyer-supplied information (such as buyer interest information) while still analyzing other information (such as publicly available information). Similarly, the system, in determining whether (and what) action to take on behalf of the buyer may analyze data other than private seller-supplied information (such as seller interest information) while still analyzing other information.

Thus, in one embodiment, the system need not rely on any real-time input from the seller and/or the buyer in order to perform an automatic action (e.g., purchase a vehicle; determine a price, offer, counter-offer, or the like). Alternatively, the system, in performing an action, even though at least partly automatically performed, may need to rely on real-time or near real-time input from the seller and/or the buyer. By way of example, the system may automatically generate one or more options, which the system then automatically presents, such as via sending one or more GUIs, to the seller and/or the buyer to solicit input. Responsive to sending the one or more GUIs, the seller and/or the buyer submits input, with the system then performing the action. In particular, responsive to a buyer submitting an offer, the system may be triggered to automatically: evaluate the offer; determine one or more options in response to the offer; and generate one or more GUIs to present the one or more options to the seller. The one or more options may comprise: countering the offer (with an indication of the amount to counter); accepting the offer from the buyer; or sending a BIN to a plurality of buyers. In this way, the seller, via the one or more GUIs, may choose what is considered the best option.

Further, various triggers are contemplated for the system to perform real-time (or near real-time) actions, including notifications to the buyer or seller. Triggers may be associated with the seller and/or the vehicle of the seller (e.g., input of inspection for vehicle) and/or may be associated with the buyer (e.g., buyer action such a real-time input indicating an interest in a certain type of vehicle, such as a bid for the certain type of vehicle). Responsive to the real-time trigger, the system may perform its analysis using up-to-date information (including updates in real-time for sales information and user input).

Turning first to FIG. 1, an exemplary hardware platform that can form one element of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as local network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Generally, the matching system facilitates matching sellers of vehicle with buyers of vehicles. In some embodiments, the matching system facilitates the transactions and transportation of the vehicle between the sellers and buyers. In some embodiments, the sellers are vehicle dealers that have vehicle inventory that they wish to sell to other dealers rather than placing the vehicle on their lot and selling to the general public. For example, a BMW dealer may sell a BMW and receive a Honda Civic on trade-in. The BMW dealer may decide that the Honda Civic is not consistent with the type of vehicles sold on the BMW lot. Therefore, the seller may provide information indicative of the Honda to the matching system. The matching system may match the Honda Civic to other dealers (referred to as "buyers" below) to sell the Honda to the general public. The matching system may match the seller to the buyer based on location, the seller, the buyer, time (e.g., season, timing trends), market activity, website data, and any other data that may be stored in the matching database as described in embodiments below.

In some embodiments, a seller may be any person or entity that interacts with the matching system to sell a vehicle. The seller may be a salesperson representing a dealership or an independent vehicle dealer. The seller may be any person that creates an account on the matching system to sell a vehicle. In some embodiments, the seller is the matching system that is working automatically on behalf of the seller, the dealer, or the personal seller.

In some embodiments, the buyer may be any person or entity that interacts with the matching system to purchase a vehicle. The buyer may be a salesperson representing a dealership or an independent vehicle dealer. The buyer may be any person that creates an account associated with the matching system to buy a vehicle. In some embodiments, the buyer is the matching system that is working automatically on behalf of the buyer, the dealer, or the personal buyer.

In some embodiments, the matching system matches sellers to a particular buyer. The matching system may obtain buyer information, inventory information, market information, and any other information associated with the buyer, and match sellers, and vehicles to the buyer preferences.

In some embodiments, the matching system facilitates the sale of the vehicle between the seller and the buyer by accessing financial accounts or connecting with a third-party financial institution. In some embodiments, the matching system facilitates transportation of the vehicle between the seller and the buyer by contacting the seller and the buyer to transport or by facilitating the transportation through a third-party transportation provider.

Figure 2:
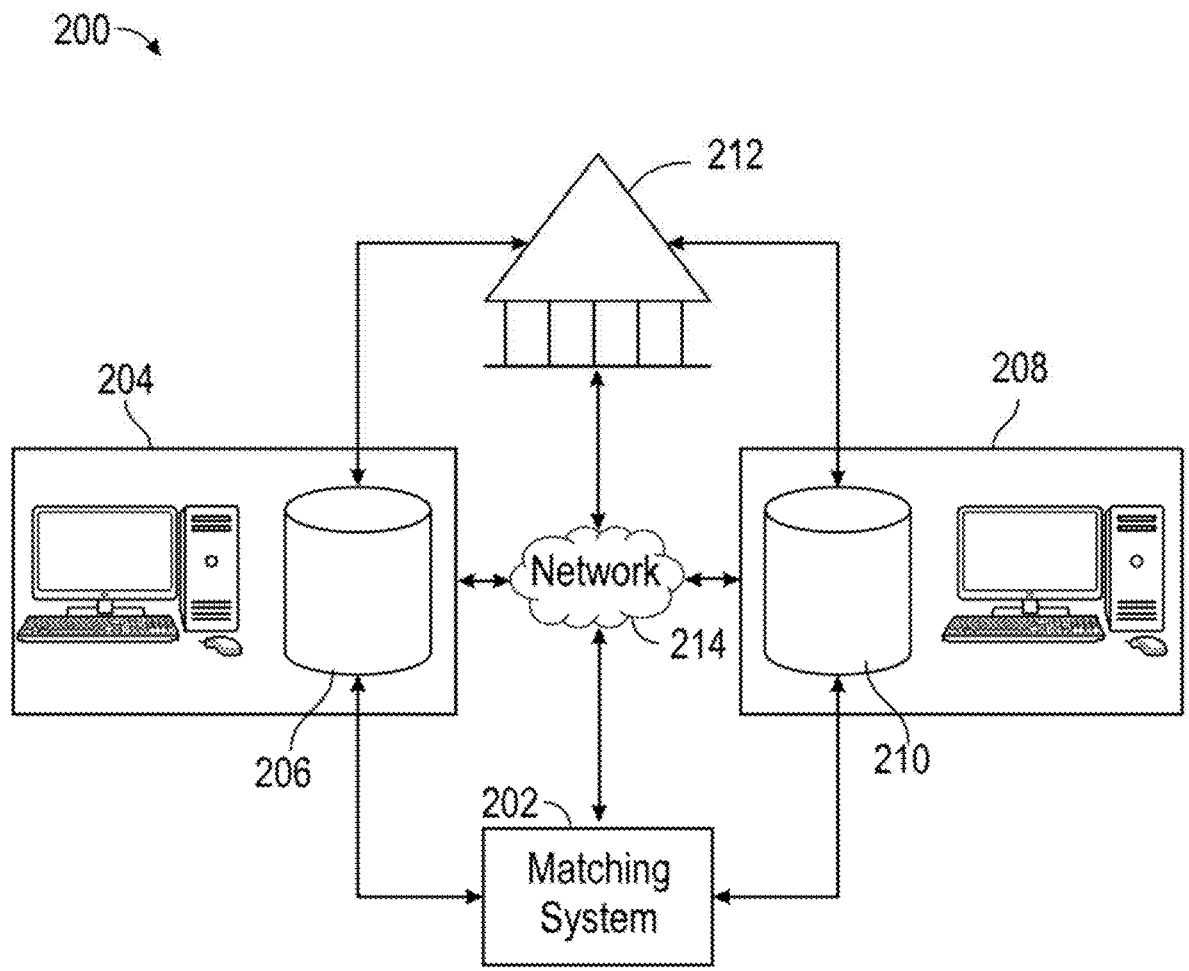
FIG. 2 depicts an exemplary diagram showing the operation in accordance with embodiments of the invention.

FIG. 2 depicts an exemplary diagram generally referenced by the numeral 200. Matching system 202 accesses various seller and buyer information and facilitates transactions and transportation arrangements. The seller system 204 comprising the seller database 206 may store the seller information, seller vehicle information, and any information associated with the seller dealership. The buyer system 208 comprising the buyer database 210 may store any buyer information, vehicle information, and any information associated with the buyer dealership. Further, the matching system 202 may communicate with a third-party (e.g., financial institution 212) and any website for facilitating transactions and vehicle transport as described in embodiments below. The communication with the matching system 202 may be performed directly or by the network 214. In some embodiments, the network 214 may comprise Internet 132 and the matching system 202 may comprise computer 102.

In some embodiments, the matching system 202 may be linked to any databases associated with any dealership or private vehicle dealer. The matching system 202 may access vehicle inventory, financial accounts, personnel accounts, and the like. The matching system 202 may access any information in the dealership and buyer and seller accounts to perform any analysis described in embodiments herein.

Seller Matching System and Method

Figure 3:
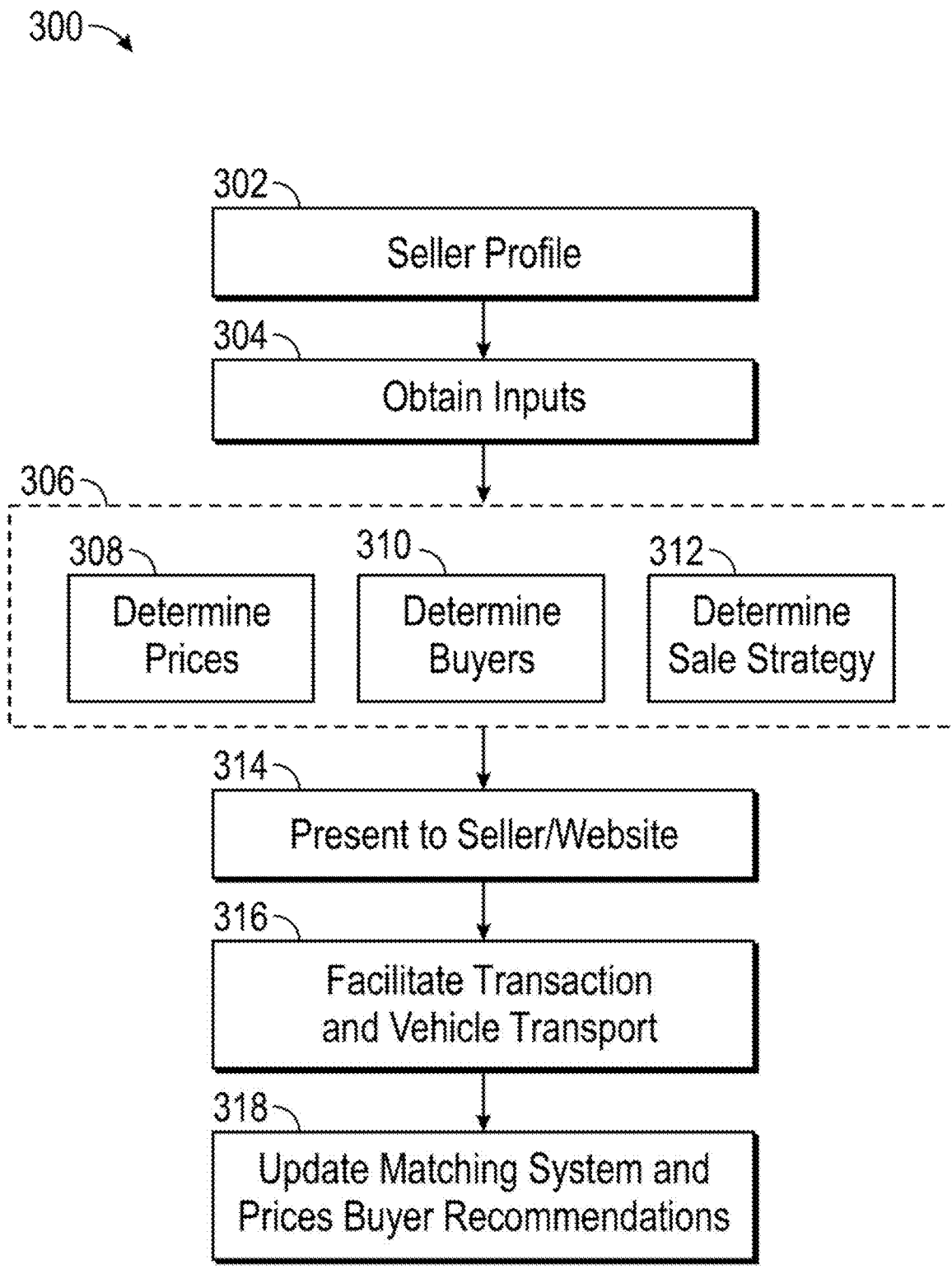
FIG. 3 depicts a flow chart illustrating an exemplary process of matching sellers and buyers of vehicles.

FIG. 3 depicts an exemplary method of matching a seller of a vehicle with a buyer of a vehicle generally referenced by numeral 300. At step 302, the seller may access the matching system 202 and create a seller profile and an associated dealer profile. The seller and the dealer profiles may comprise contact information, dealer inventory, dealer location, dealer preferences, dealer transactions, and any other information that may be useful to match a buyer or for buyers to match with sellers. The matching system 202 may also match vehicles with the inventory and the type of vehicles the dealers prefer when facilitating contact between the sellers and buyers.

In some embodiments, data is obtained and analyzed relating to the seller of the vehicle. The matching system 202 may present a user interface (e.g., seller interface) to the seller. The matching system 202 may obtain seller preferences and vehicles that the seller wishes to sell. The matching system 202 may obtain various data inputs that the matching system 202 may analyze to optimize the facilitation of matching of the seller with a buyer and determining a sale strategy. In some embodiments, the sale strategy includes vehicle sale options, pricing recommendations, timing recommendations, recommendations for potential buyers, and any other recommendations that may be helpful to the seller.

In some embodiments, the "seller" is a representative of a vehicle dealership that may be selling a vehicle to another dealer. The seller may be any person at the dealership that is looking to reduce the number of vehicles in the inventory by selling to other dealers. In some embodiments, the seller may input a dealer number or show dealer certification or a license such that only dealers are allowed to access and sell vehicles by the matching system 202. In some embodiments, the seller may be computer-executable instructions that automate the process of searching buyers, selling vehicles, and any other actions by the seller described in embodiments herein.

In some embodiments, the seller may log into the matching system 202 and create a secure seller profile. The seller profile may be indicative of the seller and the dealership that the seller represents. In some embodiments, a separate profile for the seller dealership may be created and the seller may be associated with the dealership profile.

Broadly, any profile (e.g., dealership, seller, and buyer) may be private or public and the user (e.g., buyer or seller) may define any customizable options that may be private or public. For example, the user may associate the private user profile with the public dealership profile such that other users may see the dealership information on the site. However, the other users may only see the user's name, title and/or contact information. The dealership profile may present a vehicle inventory and pictures. In some embodiments, a link to the public dealership website may also be provided.

In some embodiments, a list of vehicles and prices may be provided. In any case, it should be understood that any embodiments described below may be provided via the user interface such that a buyer or a seller may view and interact for matching purposes. In some embodiments, the buyers and sellers may only view the dealer-to-dealer sales associated with the matching system 202 as members and, as such, must submit dealer licensing information.

At step 304, the inputs are obtained by the matching system 202. In some embodiments, for-sale vehicle information is provided by the seller. The inputs may be obtained from any sources and in any process described in embodiments below. The inputs may be obtained from the seller, the vehicle electronic vehicle management system, scraped websites, previous analysis, and any other sources. The inputs may be any one, any combination, or all of: floor price of same or similar vehicles; floor-to-offer difference of same or similar vehicles; inspection data; number of bidders; price bucket of a particular vehicle type; historical transactions (including third-party transactions); timing of offers; seasonal trends; number of offers; market activity; location; transportation costs; other auction data; website scraped data; or any other data that may be useful in determining optimal price and buyer recommendations as described in embodiments below.

In some embodiments, vehicle information may be obtained. The vehicle information may include any one, any combination, or all of vehicle type, make, model, year, historical data associated with the vehicle, or inspection data. In some embodiments, the matching system 202 may receive data directly from the electronic vehicle management system via electrical communication with the vehicle. The vehicle information may be stored in the seller database 206 such that it may be accessed by the matching system 202 for determination of pricing and buyer recommendations and promotions. The vehicle information may be used to determine vehicle prices, buyers, and any other output described in embodiments below.

The inputs may be provided by the seller or may be accessed by the matching system 202 in a matching database (which may be the seller database 206 and the buyer database 210 or the local storage 122), the databases of other users, and from scraping websites for data. In some embodiments, the inputs may comprise at least one of floor price, floor-to-offer difference, inspection, vehicle history data (such as would be included in a CARFAX™ or AutoCheck® report, any vehicle title issues and vehicle owner history), number of bidders, price bucket of particular vehicle, historical transactions (including third-party transactions), complete offer history for the vehicle (e.g., the number and timing of offers on the vehicle and the number of time the page for the vehicle has been viewed), complete offer history for similar vehicles, seasonal trends and general vehicle desirability (e.g., the number of saved searches that the vehicle in question would match), elapsed time since the vehicle was first listed, elapsed time since the vehicle was last relisted, number of times the vehicle has been relisted, market activity, location, transportation costs, and any other data that may be useful in determining optimal price recommendations. In this way, by considering the various factors, the matching system may assess the level of interest with prospective buyers. As one example, there are various telltale signs of a successful auction, such as the elapsed time from first listing to the first bid (e.g., even if the first bidder does not ultimately purchase the vehicle, shorter elapsed times to the first bid tend to indicate more successful auctions). As another example, the elapsed time between bids, whether the vehicle is listed multiple times, etc. are general indicators as to the success of selling the vehicle at auction. Such general indicators may then be used the system when considering one or more prices during the auction, such as counter offers (e.g., general indicators suggesting success in selling the vehicle support recommending more aggressive counter-offers on behalf of the seller).

At step 306 the matching system 202 uses the inputs to determine vehicle pricing recommendations, buyer recommendations, and vehicle sale strategies. The input data may be analyzed using optimization programs and statistical and machine learning algorithms. Constraints may be provided for user preferences, and the input data may be analyzed to determine pricing information, timing, market information, potential buyer information, potential buyer locations, and any other data that may be useful in the selling process.

Figure 4:
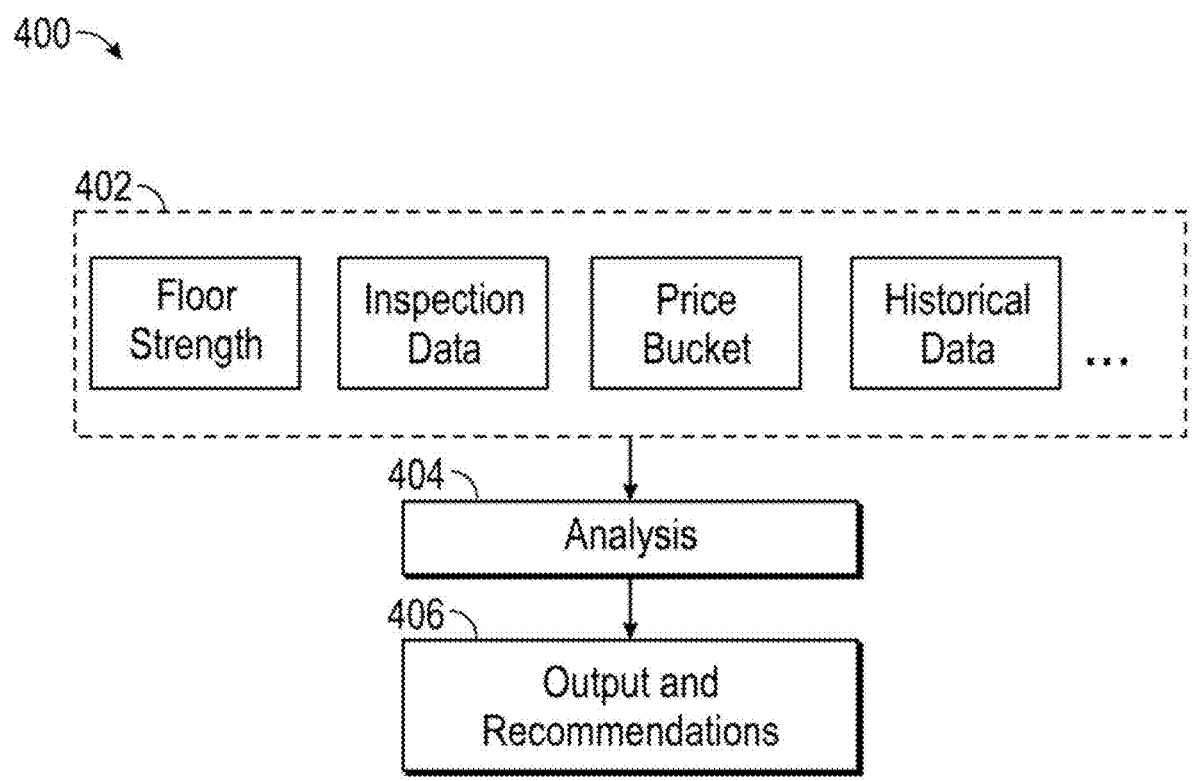
FIG. 4 depicts an exemplary flow showing a process of analysis for determining prices and recommendations for a seller.

FIG. 4 depicts an exemplary optimization method for receiving inputs 402, analysis 404 of the inputs 402, and determining outputs 406, generally referenced by numeral 400. The inputs 402 may be any of the inputs described above. In some embodiments, the output 406 is the recommended vehicle sale price, timing of the sale, recommended location of sale marketing, and the recommended buyers. However, in some embodiments, the outputs 406 may be any or all of the outputs 406 described in embodiments below. In some embodiments, the outputs 406 and combinations of the outputs 406 may generally be referenced as a sale strategy. The matching system 202 may receive the inputs 402, optimize for price, location, timing, and buyer recommendations and output to the user or provide recommendations/promotions for the vehicle automatically.

In some embodiments, the analysis may receive the inputs 402 and optimize for various objectives. For example, the optimization may be customized based on achieving a highest profit, a quickest time-to-sale, lowest transportation cost, and/or any other output 406 that may be useful to the seller. Constraints may be added into the cost function as needed. In some embodiments, constraints may be maximum and minimum prices, locations, proximity to dealership, regions having particular weather (e.g., salt by the coast, snow in the mountains, sun in the desert), desirable/undesirable buyers, desirable/undesirable dealers, and any other constraints that may be useful to the seller.

In some embodiments, linear and nonlinear optimization programs may be used to optimize for a desired output 406. In some embodiments, statistical and machine learning algorithms may be used to process data to the desired inputs 402. The statistical and machine learning algorithms may also be used to optimize for the desired output 406. For example, parameters of a neural network may be trained on known historical data to determine the most profitable or quickest time-to-sale. The neural network may take the inputs 402 described above and determine the best timing for sale of the vehicle and the best price based on the timing. For example, all-wheel-drive vehicles may sell for higher prices in the winter. Therefore, the matching system 202 analysis 404 determine that buying all-wheel-drive vehicles in the summer and fall and listing the vehicles in the winter has a high likelihood of profitability and a high likelihood of quick sale. This sale strategy may be the result of a highest profit analysis determined by the neural network. Further, a price may be determined for the vehicle to sell quickly if that is the desired outcome. The sell-now price may be determined from scraped data of vehicles of the same type recently sold in the general location of the dealer. Alternatively, or in addition, the system 202 may perform analysis on behalf of the buyer, such as recommending whether (and what) to offer for a vehicle. Similar to the analysis on behalf of the seller, the system 202 may determine, based on the various factors discussed, a highest profit analysis. In this regard, the system 202 may determine whether (and what) actions to recommend based on a profit analysis (such as a highest profit analysis). In one embodiment, the result of the profit analysis may be compared with one or more predetermined amounts. For example, the seller and/or the buyer may input a minimum expected profit per vehicle and/or an average expected profit across multiple vehicles. Depending on the output of the system 202 in its profit analysis, the system 202 may determine not to recommend an action (e.g., responsive to determining that the profit analysis is less than the expected profit per vehicle, the system 202 recommends not to the buyer not to submit a counter-bid for a vehicle).

Automatic Price Recommendations

At step 308, the inputs 402 may be analyzed to determine price recommendations for the vehicle to be presented to the seller. The inputs 402 to the matching system 202 and analysis 404 may output automatic pricing recommendations and updates for vehicles that the seller uploads for listing. For example, the seller may be a BMW dealer that has just received a trade-in for a Honda Civic. The BMW dealer posts a description of the vehicle along with vehicle information such as, for example, pictures, vehicle history, current vehicle specifications, vehicle current condition (e.g., inspection information), ownership history, location, city and highway travel, and any other information that may be useful for a buyer and/or for determining a price recommendation. In some embodiments, the matching system 202 receives and analyzes the information input by the seller to determine potential pricing option recommendations for the seller of the vehicle. For example, the vehicle information (e.g., maintenance history, inspection report (discussed below)), regional interest related to the vehicle, history of the seller, market based on location, and any other pricing information that may be useful in estimating a price of the vehicle may be used.

In some embodiments, the pricing information may be sorted and combined to determine a floor price for the vehicle (e.g., the lowest price at which the seller will agree to the sale). The floor price may be determined from low-end sales for the type of vehicle combined with reductions in the price due to the vehicle information. The floor price may be an average of the history of the low-end price results combined with the reductions or may be an absolute lowest estimated price of the vehicle. The condition of the vehicle may also be taken into account and compared to the selling and the offer prices of vehicles in similar conditions. Providing the seller with a floor price may provide the seller with a bottom end of what the vehicle may be worth. In some embodiments, the floor price is only presented to the seller as private information. In this way, a potential buyer of the vehicle does not know the estimated floor price of the vehicle. Proprietary information of the buyer is not used to provide information and recommendations to the seller and proprietary information of the seller is not used to provide information or recommendations to the buyer. This maintains a fair buyer/seller relationship.

In some embodiments, received offers for the vehicle are compared to the floor price. For example, the vehicle may be on the website for auction to dealers and the offers may be compared to the floor price. The comparison provides a difference between the floor price and the various offers. The seller may then review the offers and the locations of the offers to determine a best offer. In some embodiments, various other pricing factors may be subtracted from the price such as transportation costs and taxes. In some embodiments, the matching system 202 determines a list of the best offers based on profit, easy of delivery, dealer rankings, or any combination thereof, and presents the best offers to the seller via the seller interface.

In some embodiments, inspection data may further be used to determine an estimated price of the vehicle for the seller. Inspection data may be generated in a variety of ways, such as disclosed in U.S. Provisional Patent Application No. 63/070,477, incorporated by reference herein in its entirety. For example, continuing with the exemplary embodiment described above, the Honda Civic may be inspected by the seller. The inspection results may be obtained by the matching system 202. The inspection may be any standard 5-, 10-, 21-, 100-point, and any other type of inspection provided by the seller. In some embodiments, the seller may provide a vehicle-type-specific inspection specified by the manufacturer (e.g., Honda). The inspection results may be input by the seller and received and analyzed by the matching system 202. In some embodiments, the inspection results are obtained by the matching system 202 directly by accessing the electronic vehicle management system via a diagnostic port (e.g. an OBD-II port) of the vehicle.

In some embodiments, the inspection results may be given or assigned a score. For example, the inspection may reveal that everything is in good working condition so a score of 100 is applied. Alternatively, the tires are worn, the heater needs to be replaced, the window is cracked, the battery is low, and the timing of the engine is off. In this case, the score may be 10 out of 100 or 1 out of 10. The scores provided here are exemplary and any type of scoring method may be used.

The scores for each component may be standardized such that all scores may add up to a total score of 1 and the final score may be multiplied by the highest estimated price. A weighted average may be used based on the estimated parameters for each component. The parameter weights may be estimated using historical data in a machine learning and/or statistical algorithm. These mathematical methods may be used in any embodiments for determining and calculating prices and recommendations described herein. In some embodiments, each component of the inputs 402 may have an associated weight and all inputs 402 may be weighted to determine the outputs 406.

In some embodiments, the estimated price recommendation may be adjusted based on feedback from buyers. For example, the offers from the buyers may be on average 20% less than the asking price. A recommendation to reduce the asking price by 10% may be presented to the seller. Alternatively, a bidding war between potential buyers may start and a new higher asking price may be recommended. At any point, the seller may accept any price that may be offered. In some embodiments, the seller may set a "buy now" price (alternatively termed a buy-it-now or BIN) and any buyer may purchase at the "buy now" price at any time. The matching system 202 may manage all pricing automatically and in real-time such that the prices may be negotiated automatically without seller involvement.

In some embodiments, a price bucket of a particular vehicle type may be used as a starting point for price recommendations. For example, the Honda Civic has an estimated value based on the number of miles driven and its general condition. The price may be adjusted based on the inputs 402 to the optimization analysis. For example, the price may be reduced based on the inspection data provided above. In some embodiments, historical data and website scraping may be used to determine average amounts that a price may be reduced for reconditioning, for example, repairing the exemplary engine timing faults. This amount may be subtracted from the price of the vehicle to recommend to the seller.

In some embodiments, historical transactions may be analyzed as inputs 402 for the price recommendations as well. For example, continuing with the embodiment described above, the matching system 202 may access a transaction history of the buyers, the sellers, or any other known transaction history for all vehicles and for the specific vehicles that are being sold. In some embodiments, transaction history may be used for a particular region. For example, all available transactions for Honda Civics in the Kansas City metropolitan area may be accessed to determine a potential value in the Kansas City market. Some vehicles may be more popular in different areas based on sales data and based on features. For example, convertibles may be more popular in southern California than in Minnesota. Similarly, four-wheel-drive trucks may be more popular in rural areas than in cities. These regional biases may be taken into account in the optimization program when determining the recommendations for prices and buyers. In this regard, location may be one factor in the assessment, in terms of determining a value of the vehicle in a particular region and/or in terms of determining a cost in transporting the vehicle to the region.

In some embodiments, the timing of offers from buyers may be taken into account for pricing and recommendation. The timing of offers from buyers may coincide with high-volume sales season or when a dealership is having a sale (e.g., a Labor Day sale or a Christmas sale). These sales and high-volume seasons may be tracked over time and the optimization program may recommend a best time to list particular vehicle types, makes, and models based on the tracked timing of the buyer needs. For example, as described above, particular vehicles may sell better in different seasons (e.g., convertibles in summer and all-wheel-drive vehicles in winter). These trends may be tracked to recommend raising and lowering the prices of the vehicle based on the time of year and the location of the buyers. Further, the recommended prices may be higher when the buyers are in need of vehicles. The timing of offers and the price recommendations may also be provided for the sale strategy at step 312 discussed in detail below.

In some embodiments, a total number of unique bidders may be used to determine price recommendations and price adjustments. A large number of unique bidders may indicate a "hot market" for a particular vehicle. The price may be adjusted based on the market. Alternatively, the market may be cold such that no offers occur for a specified amount of time. The price may be reduced to attract buyers in the case of a cold market and increase when there is a hot market.

In some embodiments, a total number of offers may be an input 402 in the analysis 404 for price recommendations and adjustments. In some embodiments, the number of offers may be a historical number of offers for the seller of similar vehicles. In some embodiments, the number of offers may be a number of current offers for the current vehicle (e.g., the Honda Civic). The number of offers may be tracked such that if there is a relatively high number of offers and the offer price continues climbing, the recommended asking price and the recommended buy-now price may also be increased.

Further, continuing with step 308, prices may be recommended or adjusted based on market index and/or location of the seller and potential buyers. In some embodiments, the sellers are presented with the index of inputs 402 contributing to the price recommendation and the performance of the automatic analysis. The seller may review the local marketplace index. In some embodiments, the markets may be tracked and the seller may receive alerts when a local market or a specified market, or region, of interest becomes a hot market as described above. Adjusted price recommendations may be made for the different regions. Estimated transportation costs and taxes for the regions may also be determined and included in the analysis 404.

In some embodiments, the vehicle type is included in the marketplace index. For example, as described above, an all-wheel-drive vehicle may be more valuable in a region that receives more snow. Similarly, an electric vehicle may be more valuable in an urban area that has charging stations. A rural area that has no charging stations or has hundreds of miles between cities may not be a good fit for an electric vehicle. Therefore, the matching system 202 optimization may correlate the urban region with electric vehicle sales and the matching system 202 may promote the vehicle in the urban region for a higher price.

In some embodiments, local market data is accessed and analyzed to determine the best locations to promote the vehicle depending on value. Analysis of dealer sales and offer data and inventory across a plurality of regions may provide the best locations to promote the vehicle. In some embodiments, dealer websites may be scraped for inventory and pricing information. The matching system 202 may determine an estimated demand for the vehicle based at least in part on the historical transactions for the region, recent transactions for the regions, and pricing in the regions. In some embodiments, the inventory for regions is determined from the scraped data and a comparison of the inventory and the demand is determined. The price and region promotion recommendations may be based on the comparison.

Further, recent and historical transaction information may be analyzed to find active regions for particular vehicle type, make, and model. For example, active regions may comprise areas of high sales volume, offer volume, high prices, and number of views for a particular vehicle type. The recent transactions and price data may be indicative of high sales or offer volumes for a particular vehicle. In some embodiments, the seller may be notified of the active region and recommended a vehicle type to sell, the location to sell, and a price to list. In some embodiments, the analysis is performed when the seller uploads a vehicle to the matching system 202 and the region and price is recommended based on the vehicle. In some embodiments, the markets may be tracked and the seller may receive alerts when a local market or a specified market, or region, of interest becomes a hot market (e.g., highly profitable).

Continuing at step 308, the inputs 402 may be optimized to provide price recommendations and adjustments to determine a floor price for the vehicle. For example, the matching system 202 may comprise a floor and ask price recommender. The price recommender may determine and present the floor price and the list prices recommendations to the seller such that the seller may predict a potential profit from the vehicle. As described above, a floor price may be determined by analyzing regional market data, price data from scraped websites, historical transaction data, vehicle inspection data, and any other inputs 402 that may be useful in determining a low price for the vehicle. The low prices may be accumulated and averaged and price reductions may be applied based on measured and standard reductions for time of year, region, transportation costs, and inspection data. The historical transaction and offer data may be used as an input of the inputs 402 to determine the floor data and the recommended asking price. The historical data may be a starting point for the floor price. The floor price may be determined by accessing the historical data and finding sell prices for various vehicles of the same make and model and comparing factors contributing to the transaction price to determine a low price for the vehicle. The floor price may be provided to the seller along with a recommended listing price for the vehicle.

In some embodiments, the inspection data is entered into the matching system 202 for determination of price recommendations. In some embodiments, the matching system 202 may be connected to the vehicle management system and the data stored on the vehicle management system may be used to determine possible costs that may be reduced from any estimated or determined starting price of the vehicle based on reconditioning. In some embodiments, the reconditioning costs may be calculated such that the seller reconditions the vehicle for sale or such that the seller can provide the information to the buyer to maintain positive relationships. All possible costs associated with the information from the vehicle management system may reduce the price of the vehicle. For example, the vehicle management system may be accessed and it is determined that the battery is dead. Costs associated with battery replacement may be parts, labor, and taxes. The price of the battery replacement may be estimated and subtracted from the estimated price to determine a new floor price. Any maintenance and repair costs for the vehicle from the inspection may be subtracted from the floor price and any other estimated price to determine a recommended floor price and list prices for the seller.

In some embodiments, the recommended prices and the floor price may depend at least in part on the location of the seller. The recommended list price of the vehicle as well as the floor price of the vehicle may be determined in part by the location of the seller. The market for the location of the seller for the particular vehicle type, make, and model may be determined as described above. The floor price may be higher in more profitable markets and lower in less profitable markets. For example, if the average sale price for the used Honda Civic is $15,000 in a first market and $12,000 in a second market, the floor price may be proportional in the relative markets (e.g., $10,000 and $8,000, respectively).

In some embodiments, the floor price and the recommended list price of the vehicle may be based at least in part on the activity of the potential buyer and the activity specific to the region of the buyer. For example, the market data described above may provide an activity level of the region for the Honda Civic. The activity level may be based on trends for sales over time and may be compared to national averages, state averages, and local averages. When the sale and offer rates are high, the market is good, and the recommended list price for the area and the floor price may be higher than when no Honda Civics or similar types, makes, and models are being sold.

In some embodiments, the floor price may be determined based on relative location to potential buyers. For example, the seller may be located in a small rural town or in a city with few potential buyers. Consequently, the price may be reduced because of expected transportation expenses and low interest volume. Though the seller does not yet have a buyer because of the remote location of the seller, the vehicle may be expected to be transported a great distance. This may result in a lower bottom price and similarly, a lower recommended list price. However, the floor price and the recommended list price may be calculated based on the potential location of the buyer such that the seller may view a recommended list price and floor price based on region.

In some embodiments, the seller may be provided a set of controls to change the components contributing to the price recommendation to see how each component contributes to the price. The seller may manipulate the controls to compare differences. For example, the seller may change a location to sell the vehicle. Instead of offering the vehicle nationwide, the seller may focus on a specific market that has a high volume of sales for the Honda Civic. A higher recommended price may be presented to the user based on the smaller niche market for that particular vehicle. Further, the seller may control the optimization to focus on a quick sale rather than high profit or focus on specific buyers to maintain good relationships.

Vehicle Matching to Buyers

At step 310, the matching system 202 may determine high probability buyers for targeted marketing. The matching system 202 may analyze the buyer's profile and scrape dealer websites to determine probabilities of sale for the buyers. The buyers may be ranked according the probability and presented to the seller. Additionally, the matching system 202 may automatically present the vehicle information and buy-now prices to the buyers without input from the seller.

In some embodiments, the seller may be presented with potential buyers based on buyer activity. The buyer activity may be based on any one, any combination, or all of buyer views, offers, and purchases. The matching system 202 may search buyer historical data to determine buyers with recent views, offers, and purchases of the vehicle type, make, and models of the seller listing and present the listing to those specific buyers. Further, the matching system 202 may provide the seller with a list of the potential buyers and the buyer contact information such that the seller may contact the buyers.

In some embodiments, the potential buyers may be matched based on the potential buyer's activity in the region of the seller. Buyers may be prone to purchase vehicles in specific areas based on their own needs. For example, a particular buyer may purchase only local vehicles and so the seller's proximity may be a contributing component (e.g., one of the inputs 402) to matching a potential seller to the particular buyer. In some cases, buyers may not be local but prefer a specific region of the country due to climate or driving conditions. For example, a buyer in Minneapolis Minnesota may select vehicles in Oklahoma because there is much less snow in Oklahoma so the vehicles have not encountered salty roads. These vehicles may have less rust than used vehicles in Minneapolis. Further, Minneapolis to Oklahoma is a straight drive using Interstate 35 such that the transportation costs would be minimal. In this case, the advantage of having an inventory of salt-free vehicles could raise the listing price for the buyer to overcome the extra cost of transportation. Consequently, the matching system 202 may promote the vehicles from Oklahoma to the buyer in Minneapolis.

In some embodiments, the matching system 202 may track information associated with similar type, make, and model of vehicles. Tracking information associated with similar vehicles such as sales and offers may indicate buyers that are in the market for the seller's vehicle. For example, a Honda Accord may be listed on an online dealer auction. An offer may be made on the Accord by a buyer. The seller may be alerted of the buyer and the offer or the matching system 202 may automatically promote the Honda Civic to the buyer. Further, in some embodiments, the price of the Accord may be obtained and the Civic may be promoted to the buyer at a comparable price, as approved by the seller.

In some embodiments, data is scraped from the buyer's retail website. The matching system 202 may search websites for similar make and model of vehicles as the vehicle for sell. The matching system 202 may also recommend promoting the vehicle to potential dealers that sell a high volume of similar vehicles and have a low inventory of similar vehicles. This method may increase the odds of selling the vehicle. The vehicle may also be more valuable to a dealer that sells the types of vehicles in high volume such that a higher price may be recommended for listing to the dealer.

In some embodiments, the data scraped from the dealer website may be compared to historical website data to determine inventory of buyers and recent sales. For example, the seller may add the Honda Civic to the matching system 202. The matching system 202 may access and scrape a local Honda dealership website. The analysis 404 determines that the dealer sells small Honda vehicles of the same or similar type. The matching system 202 may then provide the seller with an option to promote the Civic to the dealer. In some embodiments, the matching system 202 automatically promotes the vehicle to the potential buyer or sends a link to the listed vehicle.

Further, the matching system 202 may compare the scraped data to past data for the same dealer. For example, the matching system 202 may analyze historical data of the buyer either obtained from website scraping and stored at the matching database or from buyer transactions via the matching system 202, and determined that the dealer previously sold used Civics. The matching system 202 recommends promoting to the dealer at a higher than average price for the region.

In some embodiments, the seller and/or vehicle is matched to or promoted to a buyer based on a potential profit margin in the market. As described above, the region, historical data, scraped data, inventory, demand, and any other data may be used to determine an estimated potential profit margin for the vehicle based on the information related to each buyer in the buyer market. The estimated potential profit margin may be based on a determined sell price for each potential buyer compared to the price paid or trade-in value for the vehicle in the market.

Sale Strategy

At step 312, the matching system 202 may determine a sale strategy. The sale strategy may include the potential prices, the potential buyers, the market analysis, and any preferences of the seller and buyers for strategic recommendations based on probability of sale under constraints such as, for example, the seller preferences. The price analyses and buyer analyses described above may be a component in the sale strategy as well as the best times to sale particular vehicles. Any of the above-described analyses may be included in determining the sale strategy.

In some embodiments, the matching system 202 recommends types of vehicles to the seller based on seasonal trends and probability of sale. For example, the seller receives an open-air Jeep on trade-in on the first day of March. The matching system 202 may access the buyer database, the seller database, and network information and determine that Jeep sales are low in March but ramp up to peak numbers when the weather improves in May and June. The matching system 202 may then recommend a current price to the seller for promotion in March and a second price to the seller that is 20% higher for promotion in May. Trends may be presented to the seller such that the seller knows the best times to sell particular types, makes, and models of vehicles to get the highest price and to sell vehicles fast.

In some embodiments, the seller may customize the vehicle auction with a call-to-action. For example, the call-to-action may be "buy it now at this low price," or "limited time offer" with a counter for a short time period in which a buyer may buy the vehicle for a low price. The call-to-action may pressure undecided buyers to buy the vehicle. Further, the call-to-action may be tracked such that the seller may see which calls perform the best. For example, a history of the controls may show that the countdown timer results in the highest number of quick sales. The seller may want to sell the vehicle as quickly as possible so the seller may use the countdown timer. Alternatively, the seller may be content keeping the vehicle for a longer period and trying to get the most money out of the vehicle. The seller may then select a control that results in the highest price but not necessarily the quickest turnaround. Trends for the call-to-action may be tracked such that the matching system 202 may present the probability of sale based on the call-to-action.

In some embodiments, a probability of sale may be calculated based on the obtained data and data from other dealer auctions. The market data, location data, activity of potential buyers, time of year, trends, inspection data, and any other data described herein may be used to determine a probability of sale of the vehicle for the seller. In some embodiments, the probability of sale may be for a specific vehicle and based on a specific buyer, dealer auction data, a region, a time of year, and so on as described above. In some embodiments, a vehicle may be recommended based on the specific buyer, a region, a time of year, and so on. In either case, a probability of sale (or sale within a particular time frame) may be associated with the recommendation.

As described above, the seller may be located in a remote location. The distance to a region of high volume sales may be great enough that the probability of making a sale is reduced as compared to a seller that is located in the region of high volume sales. Therefore, the probability of sale in the remote market may be determined to be low. This may be based on a population density or dealer density map.

In some embodiments, the floor price may be used to determine a probability of sale. The floor price may provide the highest probability of sale based on the market, the potential buyer, and any other data listed above. As the floor price is the lowest reasonable listing price, the floor price may also be the highest probability for sale for a particular market and associated buyers in the market.

In some embodiments, the probability of sale may be based on market categories. For example, the market may be categorized as hot, warm, or cold, as determined by (for example) dealer auction data. The potential buyer may have made offers recently categorizing the potential buyer as active. However, the season may be winter, reducing the chances of selling the vehicle for the buyer. All of the possible contributing factors may be combined to determine a probability that the vehicle will be sold in a particular market to a potential dealer buyer. Various statistical and machine learning algorithms may be utilized to determine the probability of sale as described in embodiments above.

The activity trends may be tracked and the probabilities for sale may be determined based on the trends. For example, all sales may be tracked and it may be determined that there is a spike in vehicle sales at the beginning of the year when people receive tax returns. Based on the increase in sales, the probability for sale may go up proportionally. Similarly, the trends may be vehicle type, make, and model specific. For example, seasonal trends may determine which vehicles are popular. As described above, all-wheel-drive vehicles may see an uptick in sales in winter months such that the sale probability is higher in winter months.

Further, the probability of sale may include historical transaction data. The historical transaction data comprise any past data described in embodiments herein including recommended prices, buyers, trends, offers, market data, location data, scraped data, and any other data available from other auctions. The historical transaction data may indicate if the recent market is hot or not compared to the historical sales data.

In some embodiments, the activity of the buyer may be used to determine the probability of the sale. In some embodiments, the probability of sale may be based on the buyer activity and location. For example, a buyer may inquire about a listed vehicle. The buyer may be located 100 miles away. The transaction history of the buyer may be analyzed and determined that the buyer only buys vehicles located outside a 75-mile radius 1 in every 20 purchases. Therefore, the probability purely based on the location is 0.05. A lower list price may be recommended to the seller for this particular buyer to increase the likelihood of a sale. However, the buyer inquiry may also be used as an input 402 such that the likelihood of a sale is higher, and the recommended list price may increase.

The volume of sales for a particular location may be compared to number of competitors in a region. In some embodiments, the number of vehicles of similar type, make, and model may be analyzed for a specific region to determine the amount of competition for a particular location of the seller. The volume of sales as compared to the competition may be weighted to determine a probability of sales using any of the described analysis above. The prices for the regions may be optimized via the analysis 404 and presented to the seller.

In some embodiments, the probability of a buyer may not be based on a local region of the buyer but may be based on a region of interest of the buyer. Returning to the example described above, where the Minneapolis buyer buys vehicles from Oklahoma to promote low salt wear on the vehicle, the seller in Oklahoma may have a high probability of selling to the Minneapolis buyer even though the Minneapolis buyer is not within a specified proximity to the Oklahoma seller.

In some embodiments, the probability of sale is based on activity trends. The activity trends may be tracked including sales and offers for sale over time. The matching system 202 may track trends for various location granularities such as, for example, the United States, the East Coast, New York, New York City, and Brooklyn. Any location granularity may be tracked, including any state, county, and a region defined as any location within a specified distance of a given location (e.g., within 50 miles, 100 miles, or 200 miles).

In some embodiments, the matching system 202 may access the inventory of the seller to automatically recommend or list inventory for the sale strategy. The user may customize the matching system 202 to automatically analyze the seller's inventory and post any vehicles. The matching system may be customized to recognize vehicle types, make, and models that may be unwanted for sale on the seller's lot and automatically determine the best market for the time of year and the best buyers for promotion of the vehicles.

In some embodiments, the matching system 202 may also automatically list or recommend vehicles based on inventory overflow. If there is a surplus of inventory, the matching system 202 may be customized to list any specific vehicles based on vehicle type, make, model, time on the lot, price, and any other factor.

Any probability may be combined with, or multiplied by other probabilities to determine an overall probability based on many factors. For example, a probability of sale may increase for the all-wheel-drive vehicle in winter. However, upon scraping websites and analyzing other auction data it may be determined that there is a disproportionately large volume of all-wheel-drive vehicles on the market. Consequently, the probability of sale is decreased. Combining the season-based probability with the auction-based probability may result in a low probability for sale for the dealer.

Present Recommendations to the User

At step 314, the matching system 202 may present the outputs 406, determined as described above, to the user. The matching system 202 may further automatically contact potential buyers, automatically promote the vehicle, and automatically list prices for the vehicle. In some embodiments, the outputs 406 are presented to the seller via the seller interface. The seller may then select the prices and the buyers and promotion of the vehicle.

In some embodiments, the seller may control the optimization and run the matching system 202 many times with different constraints input by the seller. The seller may set constraints such as, for example, a minimum list price of the vehicle, specific buyers, specific regions, specific times, and any other constraints that the seller wishes to apply. The matching system 202 may determine the optimal outputs 406 and promote prices to buyers in specific regions based on the outputs 406 and the provided seller constraints. For example, the seller may have an all-wheel-drive Subaru that is currently popular in Denver in late fall. The Denver area is a hot market and there is a dealer there with a low inventory. The seller has set a minimum price for the Subaru and the optimal price for the potential buyer in Denver is determined to be above the seller's minimum list price. The matching system 202 may automatically offer the Subaru to the potential buyer in Denver.

In some embodiments, all recommendations and processes described above may be performed automatically by the matching system 202 in the dealer management system. In some embodiments, the recommendations described above are actions automatically taken by the matching system 202 to provide a fully automated selling system for the seller. The matching system 202 may receive the seller information indicative of the seller, seller preferences, and the seller inventory. Based on the seller inventory, season, trends, location, transportation, market, sellers, buyer preferences, local customer preferences, vehicle types, makes, and models, other auctions, and any other data that is stored in the matching database, the matching system 202 may automatically promote vehicles to buyers.

Sale and Transport Facilitation

At step 316, the matching system 202 may automatically facilitate sale and transportation of the vehicle. The matching system 202 may be connected to the financial institution 212. The matching system 202 may receive approval from the seller and the buyer to conduct the financial transaction. In some embodiments, the matching system 202 may be connected to the financial institution 212 of the seller and the buyer and provide approval to the financial institution 212 to conduct the transaction. In some embodiments, the matching system 202 may access a financial account of the seller and a financial account of the buyer and conduct the transaction. In some embodiments, the matching system 202 may conduct the transaction by accessing a third-party site such as, for example, PAYPAL™ or VENMO™ and facilitate the transaction through the third-party site.

In some embodiments, the matching system 202 may facility transport of the vehicle. The matching system 202 may facilitate transportation by the seller, the buyer, or at a third-party transportation service contacted via the network 214. The matching system 202 may receive payment for transport of the vehicle through a financial account of the seller or the buyer. In some embodiments, the seller may provide transport and the price of transport may be added to the price of the vehicle. In some embodiments, the buyer may provide transport and the price of the transport may be subtracted from the price of the vehicle. In some embodiments, the third-party provides the transport service and the matching system 202 may facilitate the process by access and providing payment from the accounts of the seller or buyer.

In some embodiments, transportation costs may also be determined and presented to the user via the user interface. Generally, the location of the seller and the buyer may be input by the seller and the buyer or may be determined from IP addresses or website scraping. The matching system 202 may use the locations of the seller and the buyer to estimate transportation costs. In some embodiments, transportation companies' prices may be estimated and may be used to determine average costs, low costs, and high costs for transportation between the buyer and the seller. Further, the least expensive method of transportation of the vehicle may be determined and presented to the user. A link may be provided to a least expensive third-party transportation company. In some embodiments, when an offer is made, a transportation offer may be sent to local transportation companies to initiate offers.

In some embodiments, the seller may customize the transportation to be fully automated such that the seller does not have to search for a transportation service. The locations of the seller and the buyer may be stored and sent to the third-party transportation company when a deal between the buyer and the seller is final. The seller may approve the transportation transaction by simply selecting an "approve" button on the user interface, or the transaction may be customized to be automatic and the seller does nothing. In some embodiments, the matching system 202 may recommend that the seller provide the transportation to save cost and increase profits. In some embodiments, the transportation company information is stored such that the same transportation company may be used for all transportation accommodations.

Automatic Updates and Retraining

At step 318, the matching system 202 may automatically update when a sale has been made. The historical data, seller data, buyer data, inventory data, market data, analytics, and any other inputs may be updated based on any completed transaction or lost sale. Further, the optimization may be updated with the transaction information to optimize future recommendations based on the most up-to-date information.

In some embodiments, when a transaction is made, all of the available information for the transaction may be stored. The stored data may be used to update all known information for future analysis. For example, in the scenario described above, the Subaru is sold to a buyer in Colorado in late fall for a particular price. The information for the seller and the buyer and the historical information for the vehicle, the weather, the market, and the time of year is updated with the sale information. This provides a complete historical reference for input for optimization of future recommendations.

In some embodiments, the analysis is retrained with the new data. If the new data improves the optimization for determining probability of sale and price and market recommendations, the parameters for any machine learning algorithms may be trained on the new data. This allows the optimization to stay up-to-date with ever changing trends and new vehicles.

Buyer Matching System and Method

In some embodiments, the matching system 202 may provide a buyer interface for use by the buyer. The matching system 202 may allow a buyer to set a profile and provide buyer preferences (e.g., constraints) such as vehicle make and model, inventory, prices for vehicles, sale times for the public, and so forth. Further, the buyer may allow the matching system 202 access to vehicle associated data (e.g., make, model, year, inspection data) and the buyer inventory. The matching system 202 may use the vehicle information, the inventory information, and the buyer information to determine vehicles with a high potential for sale from the buyer's lot. The matching system 202 may scrape the Internet 124 and find sellers of vehicles that may have a high likelihood of sale on the buyer's lot. The matching system 202 may further match the buyer with sellers of vehicles that are posted on the dealer-to-dealer websites for auction.

The matching system 202 may automatically make offers to purchase the vehicles as well as facilitating the transactions and transportation of the vehicles. Any above-described embodiments directed to the seller interface may be incorporated into the buyer interface including all inputs 402, analysis 404, and outputs 406. As in the seller interface described above, the buyer interface may be fully customizable and obtain buyer and seller information for matching purposes. In some embodiments, the buyer interface may be provided by the matching system 202 and may access all data and perform any analysis as described in embodiments above (e.g., inventory, location, website scraping, market analysis, trend tracking, etc.). In some embodiments, the buyer interface may provide to the buyer a vehicle recommendation based at least in part on buyer history, seller history, location, price, offers, trends, and any other data gathered and analyzed in embodiments described above.

Figure 5:
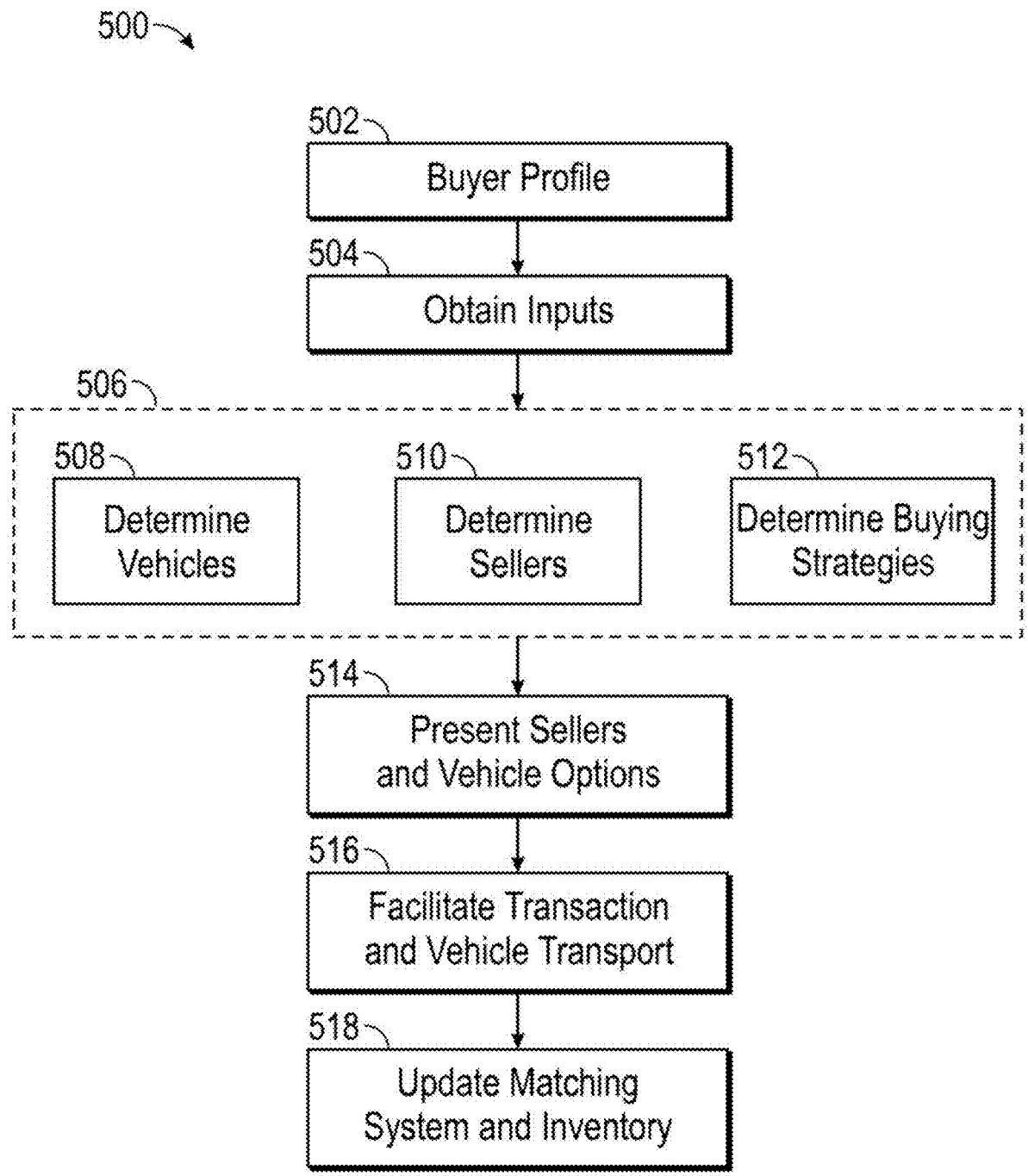
FIG. 5 depicts a flow chart illustrating an exemplary process of matching sellers and buyers of vehicles.

FIG. 5 depicts an exemplary method of matching dealers for purchase of a vehicle generally referenced by numeral 500. At step 502, the buyer may access the matching system 202 and create a buyer profile and a dealer profile. The profiles may comprise contact information inventory for dealer-to-dealer sale, dealer location, dealer preferences, and any other information that may be useful to find a vehicle that the buyer desires. Any information described in the seller profile may also be provided in the buyer profile. The buyer information and the seller information may be used by the matching system 202 to provide vehicle recommendations to the buyer and match the buyer with the seller based on the profile information.

At step 504, buyer preferences and inventory information are provided to the matching system 202. The information provided as inputs 402 may be any of desired vehicle type, make, model, inventory, preferred inventory ratios of vehicle types, makes and models, prices, locations, sales times, and preferred sellers. Further, any of the buyer preferences may be applied as constraints in the analysis 404. The information provided may also include buying times, sale times, and profit ratios based on the purchase price and expected sale prices. The expected sale prices may be determined by the probabilities for sale described above when applied to the market of the buyer for selling the vehicle to the public. The buyer information may be stored in the buyer database 210 such that it may be accessed by the matching system 202 for analytics inputs 402 for determination of potential sellers and vehicles that may be sold to the public by the buyer.

At step 506, the matching system obtains inputs 402 for analysis. The inputs 402 may be obtained from any sources and in any process described in embodiments above. For example, the inputs 402 may be any inputs listed in reference to the seller input in step 306 above. Further, the inputs 402 for the buyer may be any buyer preferences listed in step 504 above. The buyer preferences may be inputs 402 and set constraints on any optimization for the determining the outputs 406 for the buyer. Further, there may be buyer specific inputs. Any of the above described market and sale information may be input from an analysis of the public market and the dealer market.

At step 506 the matching system 202 uses the inputs 402 to determine vehicle purchasing options, seller options, and buying strategies. The input data may be analyzed using optimization programs and statistical and machine learning algorithms. Constraints may be provided for user preferences, and the input data may be analyzed to determine pricing information, timing, market information, seller information, seller locations, and any other data that may be useful in the buying process.

At step 508, the matching system 202 analyzes the inputs 402 and determines the best vehicles for the buyer. The analysis may be any of linear or nonlinear optimization programs, machine learning, and statistical algorithms as described in embodiments. Constraints may be provided for user preferences, and the data may be analyzed to determine vehicle and pricing information, potential seller information, potential locations of best deals, and any other data that may be useful in the buying process.

In some embodiments, a buyer history may be analyzed to provide vehicle recommendations to the buyer. The matching system 202 may filter seller options to provide recommendations to the buyer based on the buyer history. For example, the buyer may have a history of buying and selling a large volume of sedans. Therefore, the matching system 202 may search the seller listings and present mostly sedans to the buyer. In some embodiments, seasonal and market trends may be combined with the buyer history. For example, the buyer may have a history of purchasing convertibles in the summer. As such, during summer months, more convertibles may be searched and presented to the buyer. In some embodiments, the buyer history coincides with the market. The matching system 202 may recognize the correlation and look to the local high volume sales for suggestions based on buyer history. Matching the buyer based on the market is discussed in more detail below.

In some embodiments, a hierarchy of vehicles may be stored in the matching database. For example, the vehicles associated with a buyer's lot may be sorted by most profitable to least profitable. The most profitable vehicle may be searched and presented to the buyer first with the least profitable last. The hierarchy may also be based on current trends, the buyer history, market trends, and any other data that is included in the matching database. For example, other auction data and recent transaction data shows a high demand for sports cars. The matching system 202 may then recommend sports cars from sellers on the matching auction.

In some embodiments, recommendations to the buyer may be based on inventory. The stored inventory of the buyer may be accessed and compared to a desired inventory. The desired inventory may be customized by the buyer or may be based on the history of buying and selling of the buyer to optimize the inventory based on profitability and estimated time-to-sale. In some embodiments, the optimization may be performed with constraints on vehicle type, make, and model. The stored inventory may be updated automatically based on inventory trends such that vehicles that are no longer carried filter out after an amount of time of not being purchased by the buyer.

In some embodiments, buyer recommendations may be based on a particular market. Sales and offer activity may be analyzed to determine current market activity for defined regions. The buyer vehicle recommendations may be based on the activity of the local market. In some embodiments, the local market may be compared to non-local market if the buyer sells vehicles online and the transportation costs are low enough to provide profitable returns with a high probability of sale. Further, the vehicle type, make, and models presented to the buyer may be based on the activity of the market. The activity may be determined from recent local sales, offers, and scraping data from dealer and auction websites as described in embodiments above.

In some embodiments, the matching system 202 may take advantage of mismatched markets to offer vehicles based on arbitrage. For example, a snowstorm hits Colorado while a heat wave hits Texas. As a result there may be a surge in all-wheel-drive vehicles in Colorado and a lapse in sales of similar vehicles in Texas. The buyer in Colorado may be notified of the mismatch by the matching system and presented vehicles that may be profitable given the current situation. The buyer may then select and purchase an all-wheel-drive vehicle in Texas at a relatively low price with minimal transportation costs, and sell the vehicle in Colorado in a hot market for that particular vehicle.

In some embodiments, the buyer recommendations may be further based on location. For example, the buyer may be located in a snowy northern region. Consequently, a high ratio of all-wheel-drive vehicles may be presented to the buyer. Similarly, the buyer may be located in a high-income area of the city. Consequently, a high ratio of luxury vehicle may be presented. In some embodiments, a distance from a seller may be determined and a transportation cost may be estimated to better estimate actual profitability. In this case, a recommendation that the buyer make an offer requiring the seller to pay transportation costs may be provided.

In some embodiments, the buyer recommendations may be based on dealer preferences. The buyer may customize the buyer interface to include spending limits, blacklisted sellers, whitelisted sellers, risk propensity, and vehicle amenities. In some embodiments, the buyer may include an upper and lower limit to the price of the seller vehicles that may be recommended or may include a total amount. In some embodiments, the cost of buying the vehicles is automatically based on recent sales as a ratio of sales or based on an amount of money in a particular account.

In some embodiments, the recommendations may be based on the risk. The risk of selling a vehicle may be determined based on the trends, location, vehicle type, buying price, and any other inputs 402 that may be accessed by the matching system 202 as described above. The risk may be determined by taking all possible cost variables into account and determining a profitability and a likelihood of sale. The likelihood of sale may also be based on timing such that the likelihood of sale within 1 week is 10%, within 1 month is 35%, and so on.

The likelihood of sale may be based on the sale price of the vehicle as well. For example, the likelihood of sale of a particular vehicle may be higher at $20,000 than it is at $25,000. The dealer preferences may be weighted to sale for higher profit than quickly so the optimal list price may be determined to be closer to the $25,000 price. Therefore, the vehicle sell price provided by the seller may be subtracted from the optimal list price of the buyer to determine a potential profit for the buyer based on the likelihood of sale at the optimal price.

At step 510, the matching system 202 may determine and recommend sellers that suit the buyer's needs. The sellers may be determined from seller information such as, for example, location, previous sales, seller inventory, previous seller/buyer interactions, timing, market, and any buyer information and inventory described herein.

In some embodiments, the buyer may customize a list, or the matching system 202 may automatically store a list of sellers. The seller list may be a blacklist of sellers the buyer does not want to deal with or may be a whitelist of sellers the buyer prefers to deal with.

In some embodiments, the buyer may initially be matched with a seller that they have previously interacted with that has a high rating. The buyer may provide feedback about seller interactions and the matching system 202 may evaluate the sellers partially based on the buyer feedback regarding the history of the seller. For example, if the buyer had a good experience with the seller, the buyer may provide positive rating such as, for example, 8/10 or above satisfactory. The feedback may be incorporated into the analysis and provided a weight against the other inputs. A final score for each seller may be determined and presented to the buyer or automatic bids may be generated based on the seller scores. The buyer may be matched with any seller based on any one or a combination of the inputs 402.

At step 512 the matching system 202 may determine buying options and automatically initiate a bid or determine recommendations to the buyer based on the analysis described above. In some embodiments, the matching system 202 may further provide a recommended bid (or recommended bid ceiling) price for a vehicle (either automatically recommended or manually located by a buyer) by the buyer interface. These bid prices may take into account the estimated resale value of the vehicle at the buyer's location, transportation costs to relocate the vehicle from the seller's location to the buyer's location, any estimated reconditioning costs for the vehicle, and/or any other factors that could impact the buyer's profits on the vehicle. For example, if the recommendation system estimates that the buyer could resell a recommended vehicle for $5,000 once it has been restored to good condition, that transportation costs would be $300, and that it would cost $400 to restore the vehicle to good condition, the matching system 202 could tell the buyer "We recommend you bid up to $2500 to make up to $1800." In some embodiments, the buyer can specify a minimum profit and only vehicles where the matching system 202 estimates that amount of profit can be made will be recommended to the buyer. A likelihood of sale may be determined at each buying price and profit evaluation for comparison. All options for price and profit may be presented to the buyer and automatically bid on by the matching system 202.

In some embodiments, scores may be determined to provide the buyer with an easy-to-understand evaluation method. For example, a likelihood-of-sale of 80% within one month at a profit of 30% of the buying price from the seller may present a score of 9 out of 10 to the buyer. Alternatively, a likelihood-of-sale that the vehicle will sale within one month is 20% with a profit of 5% may be determined to be a lower score of 3. The scores may be determined by combining any inputs 402 and outputs 406.

At step 514, the matching system 202 may calculate and present the outputs 406 and present any of vehicle recommendations, offer recommendations (including recommended bid prices, likelihood-of-sale, and scores), potential locations of best deals, and any other data that may be useful in the buying process based on the analysis described above.

In some embodiments, all recommendations and processes described above may be performed automatically be the matching system 202. In some embodiments, the recommendations described above are actions automatically taken by the matching system 202 to provide a fully automated buying system for the buyer. The matching system 202 may receive the buyer information indicative of the buyer, buyer preferences, and the dealer inventory. Based on the dealer inventory, season, trends, location, transportation, market, sellers, buyer preferences, local customer preferences, vehicle types, makes, and models, and any other data that is stored in the matching database, the matching system 202 may automatically make offers on vehicles to dealer sellers. The offers may be presented by the matching system 202 by the buyer interface.

At step 516, may facilitate the purchase and transport of a purchased vehicle. In some embodiments, the matching system 202 may automatically determine a vehicle for purchase and make an automatic offer on the vehicle. When the sale of the vehicle is approved, the matching system 202 may independently facilitate the transaction by accessing a financial account or connect with at least one third-party financial institution to facilitate the transaction. Further, the matching system 202 may connect with the seller, the buyer, and a third-party transportation company to facilitate transportation of the vehicle.

At step 518, the matching system 202 may automatically update when a transaction has been made. The historical data, seller data, buyer data, inventory data, market data, analytics, and optimization may be updated with the transaction information to optimize future recommendations based on current data. Upon confirmation of the transaction, receipt of the vehicle, and sale listing of the vehicle by the buyer, the matching system 202 may update the buyer inventory and search criteria to continue searching for vehicles for the buyer. The buyer information may be updated at each point of the processes described above to maintain up-to-date real-time information for the buyer, the inventory, and the market. In some embodiments, the optimization and retraining of machine learning algorithms occurs as described in reference to step 318 described above.

As discussed above, the matching methodology may be one part of a system to assist the seller and/or the buyer at various stages of the selling and/or buying process. Thus, in one or some embodiments, the matching methodology may be part of an automatic/programmatic methodology (interchangeably termed Autopilot), which may be configured for the seller (as an automatic/programmatic selling methodology) and/or configured for the buyer (as an automatic/programmatic buying methodology).

Generally speaking, Autopilot may assist the seller and/or the buyer at different stages of the sale of the vehicle. For example, Autopilot may generate and send one or more GUIs for transmission to one or both of a seller or a buyer, the one or more GUIs indicative of soliciting input from the one or both of the seller or the buyer in configuring automatic operation during at least two of the following stages of auction of the vehicle: at a beginning of the auction; during the auction; closing the auction. Responsive to sending the one or more GUIs, Autopilot may receive input regarding configuring automatic operation during at least two of the following stages of auction of the vehicle: at a beginning of the auction; during the auction; closing the auction. Thereafter, responsive to receiving a trigger, the system may perform automatic operation during at least two of the following stages of auction of the vehicle (e.g., on behalf of the seller, send one or more seller GUIs for each of beginning of the auction, during the auction, and closing the auction; on behalf of the buyer, send one or more buyer GUIs for each of beginning of the auction and during the auction but not closing the auction). In practice, Autopilot on behalf of the seller may comprise, at the beginning of the auction, automatically generating one or both of a floor price indicative of a minimum price at which the seller accepts the sale or an initial ask price indicative of an initial price at opening of the auction at which the seller accepts the sale without counteroffer (Autopilot may then transmit to the seller a GUI requesting approve to use the floor price or the initial ask price in selling the vehicle; alternatively, Autopilot automatically uses the one or both of the floor price or the initial ask price without prior approval by the seller). Autopilot on behalf of the buyer may comprise, at the beginning of the auction, automatically generating one or both of a max price indicative of a maximum price at which the buyer will bid during the auction or an initial bid price indicative of a first bid by the buyer at the auction. Alternatively, or in addition, Autopilot during the auction may, on behalf of the seller, may automatically generate a counteroffer of the seller in response to a bid submitted by the buyer and automatically suggest a timing for sending the counteroffer of the seller to the buyer. Similarly, Autopilot during the auction may, on behalf of the buyer, may automatically generate a counteroffer of the buyer in response to a bid submitted by the seller and automatically suggest a timing for sending the counteroffer of the buyer to the seller.

In this regard, the one or more seller GUIs may be indicative of programmatic selling directed to at least one or more aspects related to price of the vehicle and one or more aspects related to closing for the vehicle and/or the one or more buyer GUIs may be indicative of programmatic buying directed to at least one or more aspects related to price of the vehicle. In practice, responsive to sending the one or more seller GUIs and the one or more buyer GUIs, Autopilot receives input, which may then be used when a trigger is received. In particular, responsive to the trigger (such as input of an inspection report), Autopilot may: generate, on behalf of the seller, an initial sale price for the vehicle; generate, on behalf of the buyer, an initial purchase price for the vehicle, wherein the generating of the initial purchase price is independent of the generating of the initial sale price and wherein the generating of the initial sale price is independent of the generating of the initial purchase price; and automatically determining whether to execute the sale of the vehicle based on the initial sale price and the initial purchase price of the vehicle.

At one, some, or each of the different stages, Autopilot may thus enable the seller and/or the buyer to configure for fully automatic operation (e.g., without any input from the respective seller or buyer), partially automatic operation (e.g., an automatic recommendation generated with manual confirmation by the respective seller or buyer), or fully manual operation (e.g., Autopilot prompts, without a recommendation, the respective seller or buyer for input). In this regard, Autopilot enables various gradations of automation, allowing the seller and/or buy to tailor the system to as much, or as little, input from the respective seller or respective buyer. Thus, Autopilot may be akin to selecting an index fund with specific market characteristics (e.g., S&P 500 vs. the Russell 1000), enabling sellers or buyers to shape the results by setting preferences.

As one example, buyers may set preferences, such as for groups of cars like "junk vehicles near me" (e.g., vehicles less than <$500 that are inoperable and within 150 miles of my location) or "hot vehicles in my areas", etc. by setting up a budget for programmatic buying, as discussed in detail below. As another example, sellers may instruct Autopilot to make decisions at the individual vehicle level or at the portfolio level (deciding across groups of vehicles, such as all vehicles offered by seller). In this way, a buyer or seller may utilize Autopilot, which may capitalize on the holistic nature of the data in the marketplace, considering various factors, such as physical geographic location, in order to let the marketplace use inputs to create a result that mimics the results of the overall marketplace.

In particular, with regard to sellers, Autopilot is configured to analyze historical behavioral buyer and seller data along with the vehicle and market data in order to generate one or more automatic recommendations, such as predicting when and/or how much to counter on behalf of a seller. Autopilot may thus generate the recommendations, such as price recommendations including counter offers, may by analyzing various factors, including historical behavioral buyer and seller data, and vehicle and market data in order for the recommendation to have an expected result. In one or some embodiments, the expected result may comprise a conversion rate (e.g., the percentage of vehicle sales). In particular, Autopilot may have, as one of its goals, a predetermined conversion rate, which may be set by the seller. A conversion rate of 100% (where all vehicles are sold when listed) may be considered too high. Instead, a conversion rate 65%-70% may be more desirable since it may be considered a balanced approach between too much and too little aggressiveness in pricing. Autopilot may generate its automatic recommendations (e.g., in terms of one or both of the pricing recommendations or the timing of the pricing recommendations) in order to achieve, in the aggregate, the predetermined conversion rate. In this way, Autopilot may recognize specific behaviors (for example, setting a price or a "buy-it-now" (BIN) on a vehicle on day one may lead to higher conversion rate, thereby factoring in the expected conversion rate, and a higher price) that when applied consistently may bring more for the sellers on their portfolio. Further, combining the power of Autopilot with the configurability of Autopilot enables a respective seller to tailor Autopilot to the respective seller's needs, such as tailoring to specific automatic controls performed by Autopilot, to broader controls of the seller performance vs. the marketplace or to ceding control over the seller's entire portfolio or enabling specific controls over the portfolio or vehicle.

Merely by way of example and as discussed further below, Autopilot enables the seller to configure one or more automatic aspects including any one, any combination, or all of: (i) related to BIN (including when and/or what BIN to offer); (ii) related to price (including one or both of autogenerating asking price and/or floor price) (iii) related to closing (including when to autosell, such as when to autosell above target or above floor).

Similar to the configuration for sellers (see FIG. 12), Autopilot enables buyers to elect more or less control over the programmatic buying, such as setting filters on any of the factors from the input (to filter out specific geographic areas, makes, models, etc.) and/or set controls to only buy when vehicles can make more than a set amount. In this way, Autopilot may analyze both historical behavioral buyer and seller data along with the vehicle and market data, and analyze the reconditioning information in order to assess the profitability for specific buyers. By combining this information, Autopilot may personalize vehicle recommendations in real-time for buyers based on any one, any combination, or all of: their local market (e.g., the retail data showing which vehicles work best in their area) 1 their past buying experience (to know it matches their buyers); how relevant this vehicle is for other buyers (e.g., identifying when it may be undervalued for others); etc. In this way, Autopilot may send a buyer a real-time notification on a specific vehicle, tailored to the buyer's preferences, such as discussed further below with regard to FIG. 13.

In one or some embodiments, the programmatic settings may be coupled with prioritized buyer purchasing so that buyers with the programmatic settings may be offered the vehicles for purchase prior into the marketplace. For example, in one or some embodiments, buyers that configure automatic purchasing (without buyer input) may be given first priority since such a configure guarantees a sale for a seller. In the event that the system fails to identify a buyer with automatic purchasing, the system may send a limited-time offer to purchase the vehicle to buyers to confirm the programmatic purchase (if such a setting was applied).

Figure 6:
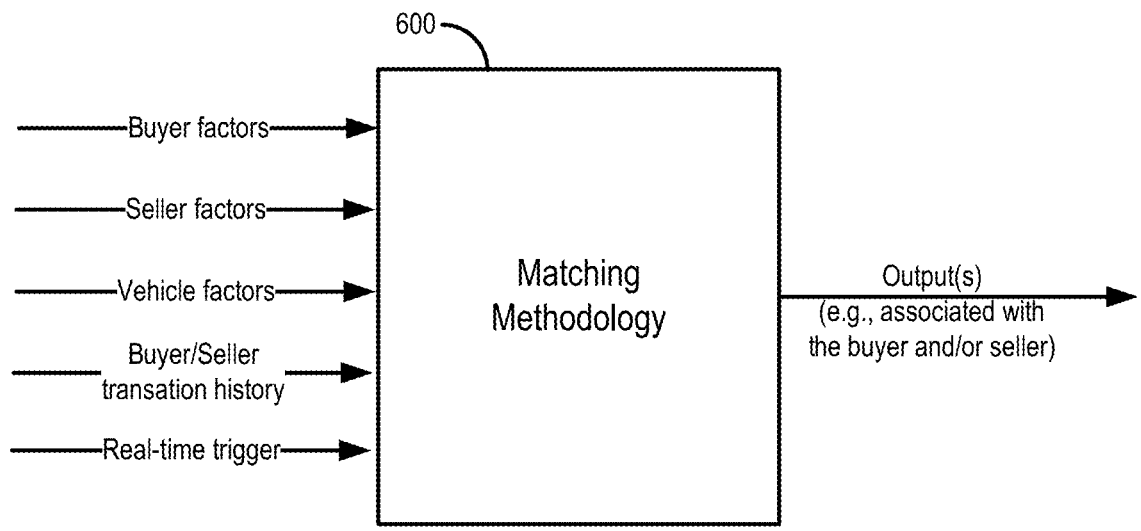
FIG. 6 is an example block diagram of the matching methodology.

Referring back to the figures, FIG. 6 is an example block diagram of the matching methodology 600. As discussed above, various factors may be used as input for the matching methodology 600. As illustrated, the matching methodology 600 may consider any one, any combination, or all of: buyer factors; vehicle factors; seller factors; buyer/seller transaction history; or real-time trigger(s). Example buyer factors include any one, any combination, or all of: physical location of the buyer; view, bidding and/or purchase history of the buyer; or vehicle sales relevant to the geographic location of the buyer and seller to indicate. Example seller factors include any one, any combination, or all of: physical location of the seller; previously listing, bidding, and/or sales history of the seller; or vehicle sales relevant to the geographic location of the seller. Example buyer/seller transaction history factors include any one or both of: has this buyer/seller pair made a purchase previously; or what was the result of the previous purchase relative to the BlackBook value at the time of the sale.

Example vehicle factors include any one, any combination, or all of: physical location of the vehicle; current make, model, year and/or mileage of the respective vehicle; engine type and/or transmission of the respective vehicle; engine recording of the respective vehicle; registration history (e.g., indicative of previous geographic locations of the vehicle, which may further be indicative of wear to the vehicle); inspection and arbitration history for similar vehicles (e.g., similar make, model year, and/or mileage to the respective vehicle); or condition report by an inspector, which may be geo and time-stamped. The matching methodology 600, analyzing the condition report in combination with one or more other vehicle factors, such as similarly situated vehicles, may indicate potential failure points in the respective vehicle. In turn, the matching methodology may estimate the cost to recondition, thereby assisting the seller in understanding the wholesale value of the respective vehicle and/or assisting the buyer in preparing the vehicle for ultimate sale.

As discussed above, various triggers to the matching methodology 600 are contemplated. One example trigger is associated with the vehicle itself, such as an inspection associated with the vehicle. In particular, the inspection of the vehicle may be input to the system. Responsive to the input of the inspection, the system, in real-time or in near real-time, may request the matching methodology 600 to review all potential buyers based on some or all of the available inputs (such as those illustrated in FIG. 6) in order to generate a ranking for a best match (or best matches) for potential buyers. Alternatively, or in addition, the trigger may be associated with the buyer. For example, the buyer may express an interest in a vehicle, such as by bidding for a specific make/model/year vehicle or by inputting to the system one or more factors of vehicles that the buyer wishes to be notified (e.g., see FIG. 13 in which the buyer requests notification of vehicles of "Ford Trucks Near Me"). Responsive to the expression of interest, the system, in real-time or near real-time, may request the matching methodology to identify vehicles with the one or more factors indicated.

Responsive to receiving the real-time inspection trigger, the matching methodology 600 may generate one or more outputs associated with the buyer and/or the seller. In one or some embodiments, the output may be in support of automatic/programmatic selling and/or automatic/programmatic buying. As discussed in more detail below, programmatic selling, which may automatically generate (and automatically implement or implement pending approval of the seller) one or more aspects associated with the sale of the vehicle, including any one, any combination, or all of: initial offer price; counter-offer prices; timing of counter offers; BIN prices, etc.

Further, as discussed in more detail below, programmatic buying may be automatically performed for buyers who have a set budget and in which the matching methodology 600 may identify one or more vehicles that matching the respective buyer's criteria. In particular, the automatic/programmatic buying may assist buyers who still wish to retain some amount of control, which may be configurable, as described below. Alternatively, or in addition, the system may allow a buyer to make the ultimate decision to purchase certain vehicles, thereby still complying with preset budgets for purchases (e.g., minimum of 10 purchases a month). In one or some embodiments, the system may provide, along with the recommendation to buy, relevance scores for the buyer's geographic location based on the potential profit for the specific vehicle given its condition. This would thereby indicate match or relevancy scores based on input factors. Further, the system may indicate float (e.g., the financing option or floorplan used by buyers) to predict actual and realized value based on average sale times.

Thus, the matching methodology 600 may use the preferences of each buyer in order to rank the top matches using one or all of the inputs as illustrated in FIG. 6 and may rank by likelihood to buy and/or potential profit based on the reconditioning estimate minus the retail value estimate. As discussed further below, a buyer may configure the automatic/programmatic purchasing methodology (e.g., automatic purchasing of vehicles with one or more features). As such, the output of the matching methodology 600 may be input (and act as a trigger) to the automatic/programmatic purchasing methodology.

Figure 7:
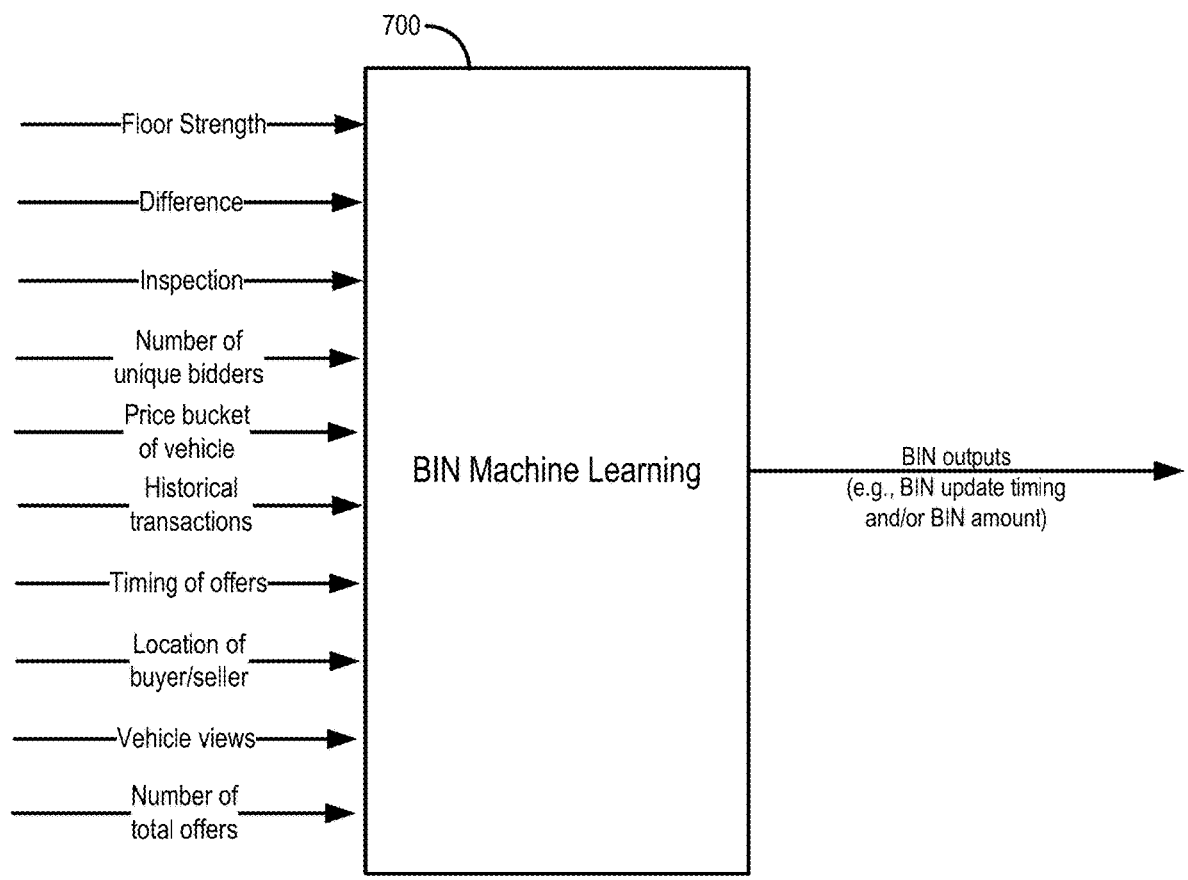
FIG. 7 is an example block diagram of the buy-it-now (BIN) machine learning.

FIG. 7 is an example block diagram of the buy-it-now (BIN) Machine Learning 700. The BIN Machine Learning 700 may comprise a trained neural network that is configured to optimize for one or more factors, such as optimizing for highest sale price or highest sales percentage. For example, sales percentage may comprise an indicator of the strength of vehicles selling in the marketplace (e.g., the higher the percentage, the higher the likelihood of the sale). In this regard, vehicles in a certain grouping (e.g., price band/make/model/mileage/etc.) with a higher sales percentage (e.g., 95%) may benefit by altering the bidding strategy versus another grouping of vehicles that has a lower sales percentage (e.g., only converted at 45%).

Further, the BIN Machine Learning 700 may generate one or more BIN outputs, such as one or both of the BIN update timing (e.g., the timing at which the BIN is updated) or the BIN amount. As discussed further below, the BIN may be updated one or more times during the sale of a respective vehicle. The timing of when the BIN is updated may affect the overall outcome. By way of example, a vehicle may be listed with a BIN at $10,000 and with a floor price (not visible to the buyer) at $8,500. As discussed further with regard to FIG. 8, the methodology may automatically modify the BIN to match the floor price responsive to determining that no offers have been received above $8,500.

Various inputs to the BIN Machine Learning 700 are contemplated, including any one, any combination, or all of: floor strength (e.g., how close the floor value is relative to the BlackBook value, which is an indicator of the market wholesale value for a vehicle); a difference between values (e.g., the difference between the floor price and a top offer); inspection (e.g., information associated with the inspection of the vehicle, such as the amount of repairs required); number of unique bidders; price bucket of the vehicle (e.g., vehicles may be organized into similar price buckets or price bands, such as a decile of the price of the vehicle; vehicles in a similar price bucket may have a similar sales percentages); historical transaction; timing of offers; location of the buyer and/or seller; number of vehicle views; or number of offers.

Figure 8:
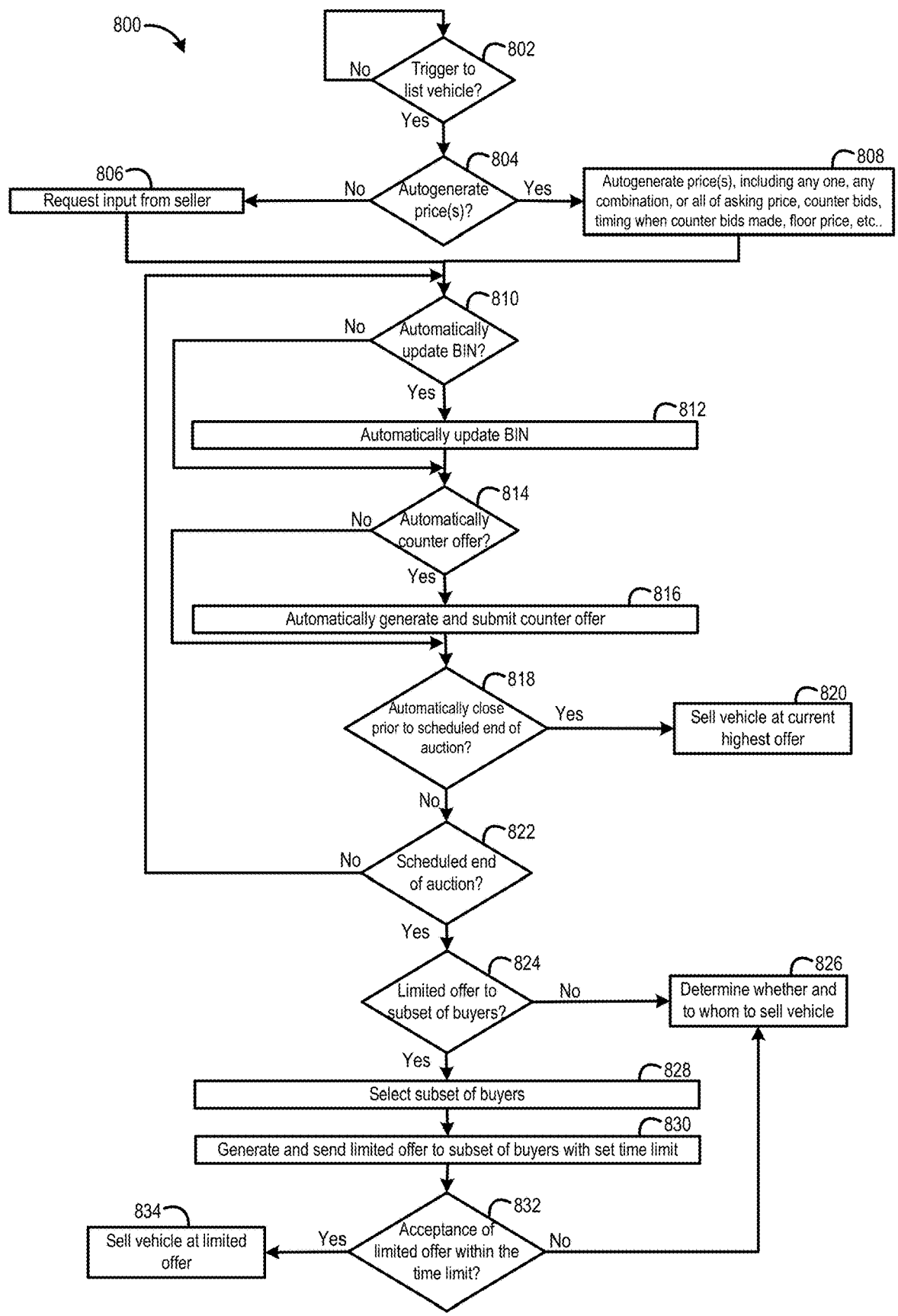
FIG. 8 is a first example flow chart for selling a vehicle.

FIG. 8 is a first example flow chart 800 for selling a vehicle. At 802, it is determined whether a triggers is identified to list a vehicle. As discussed above, various triggers are contemplated, such as input to the system of an inspection report, which is one example indication that the vehicle will be listed. At 804, it is determined whether one or more prices are autogenerated. If not, at 806, the system may request input from the seller as to the one or more prices. If so, at 808, the one or more prices are autogenerated. As discussed above, various prices may be autogenerated during the process of selling a vehicle, such as any one, any combination, or all of: the initial asking price (which may be considered a BIN); the floor price; counter bids; timing of counter bids; etc. In one or some embodiments, autogeneration of prices may be performed responsive to an immediate need for the respective prices. For example, only the initial asking price and the floor price may be generated prior to listing the vehicle. After an offer is submitted, the system may then autogenerate the counter bid and the timing when to submit the counter bid.

At 810, it is determined whether to automatically update the BIN. As discussed above, Autopilot enables a seller to configure for automatic operations at various stages of the sale, such as initially, during the auction, at closing, or after closing. For example, the BIN may be updated after initially generating the prices (whether at 806 or 808). The BIN may be updated under one or more circumstances. As one example, the BIN may be updated depending on a length of time since the last bid. In particular, the BIN may be updated if a time lapse since the last bid is greater than a predetermined amount. See 920. If so, the BIN may be reset. As another example, the BIN may be updated dependent on a length of time since beginning the auction with no bids submitted. See 914. In this regard, one or more circumstances may dictate resetting of the BIN so that the BIN may be automatically and iteratively generated. Responsive to determining to update the BIN at 810, at 812, the BIN is automatically updated. Alternatively, the system may generate a new BIN and may send a communication with the suggested new BIN in real time to the seller requesting authorization to update the BIN. Still alternatively, the system may notify the seller that a new BIN is recommended, and requesting the seller to generate the new BIN himself/herself. Responsive to determining not to update the BIN at 810, flow chart 800 moves to 814.

At 814, the system determines whether to automatically counter offer. As discussed above, Autopilot enables a seller or a buyer to tailor the automatic features to the seller's or buyer's liking. In this instance, responsive to the seller configuring Autopilot to automatically counter offer, at 816, the system automatically generates and submits the counter offer. Further, the system may determine the timing when to submit the counter offer, as discussed above. Alternatively, the system may generate a counter offer and may send a communication with the suggested counter offer in real time to the seller requesting authorization to send the suggested counter offer. Still alternatively, the system may notify the seller that a counter offer is recommended, and requesting the seller to generate the counter offer himself/herself.

At 818, the system determines whether to automatically close the auction prior to the scheduled end of the auction. If so, at 820, the vehicle is sold at the current highest offer. If not, flow chart 800 goes to 822. As discussed above, Autopilot enables configuration at various stages of the auction including closing. In such an instance, Autopilot enables the seller to configure automatic termination of the auction prior to the originally scheduled termination under certain circumstances. For example, responsive to determining that a predetermined time has elapsed since an offer above the target price was submitted (see 922), the vehicle is sold and the auction termination.

At 822, the system determines whether the scheduled end of the auction has passed. If not, flow chart 800 loops back to 810. If so, at 824, the system determines whether to generate a send and limited-time offer to a subset of buyers. If not, at 826, the system determines whether and to whom to sell the vehicle (if at all). If so, at 828, the system selects a subset of buyers, and at 830, generates and sends a limited offer to the subset of buyers with a set time limit. At 832, the system determines whether one of the buyers in the subset has accepted the offer within the set time limit. If so, at 832, the vehicle is sold at the price in the limited offer. If not, flow chart 800 loops back to 826.

In particular, under certain circumstances, offers for the vehicle may not have reached the floor price at the end of the scheduled auction. Such circumstances may merit a "last chance offer" in which the previously listed price is discounted and a subset of buyers are selected to receive the real-time communication (whether in the form of a text, a GUI, or the like). The system may select the subset of buyers in one of several ways. In one way, the system may select the subset of buyers based on buyer input, including any one, any combination, or all of: (1) based on buyer inputs to Autopilot (e.g., buyer indicates to Autopilot vehicle features for a watchlist (see FIG. 13) that match the vehicle features of the vehicle subject to the present auction); or (2) based on the highest or higher bidders to the present auction. The system may also generate the discounted price (either automatically without seller input or automatically with seller authorization) to offer, for a limited time, to the subset of buyer(s). For example, responsive to no offers submitted for a vehicle with a floor price of $10,000, the system may offer the vehicle for a limited time (e.g., 10 minutes with a countdown clock) to one or more buyers. When offered to more than one buyers, the first buyer to accept, within the limited time allotted, purchases the vehicle. For example, the system may close the auction for a vehicle with a floor price of $10,000 that did not receive any bids at or above the floor price, and may offer the vehicle in a real-time communication (at or substantially at the close of the auction) to a set of buyers for $9,750, with a time limit of 10 minutes to respond to the offer. The first of the set of buyers who accepts the offer at $9,750 purchases the vehicle.

Figure 9:
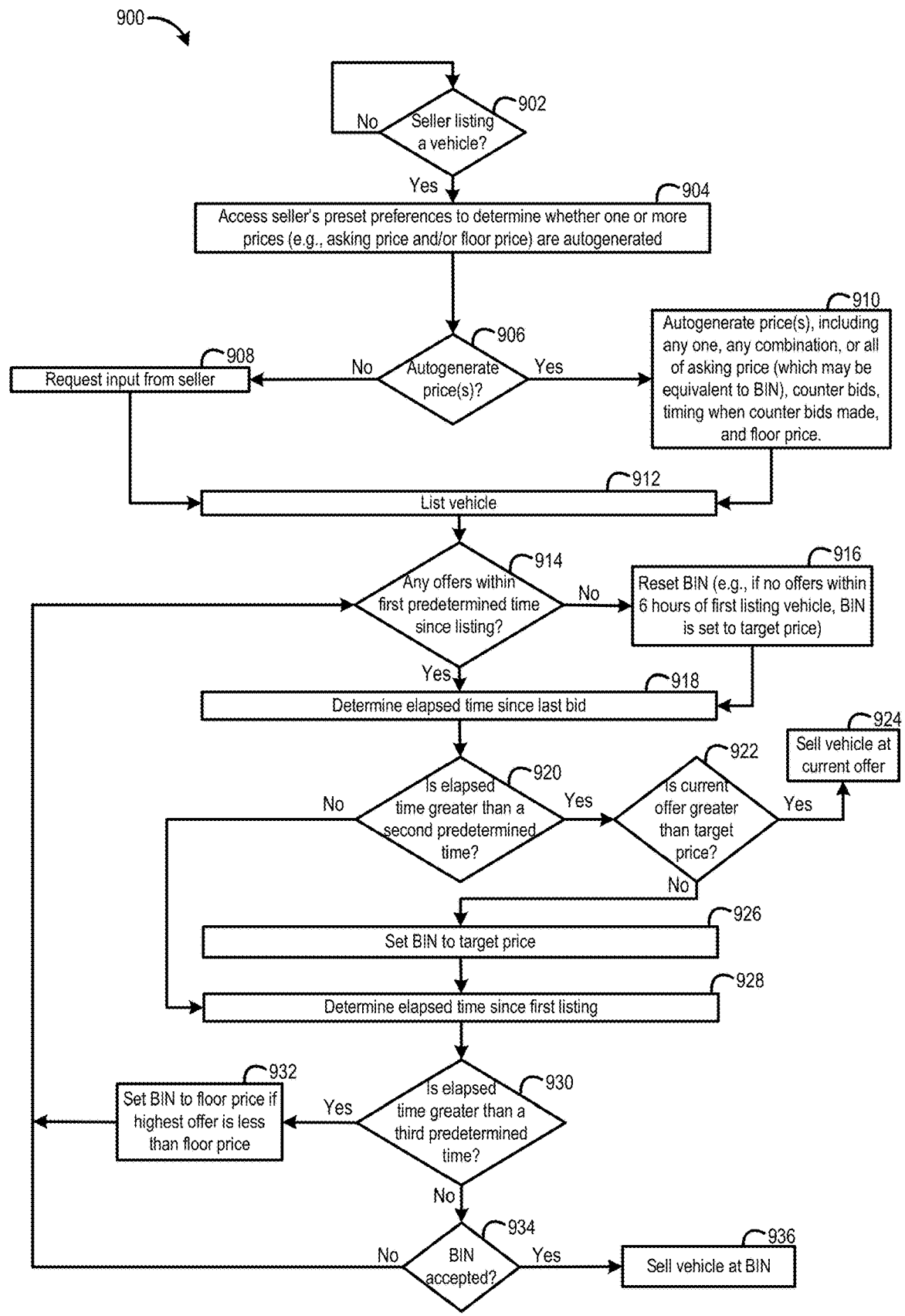
FIG. 9 is a second example flow chart for selling a vehicle.

FIG. 9 is a second example flow chart 900 for selling a vehicle. At 902, the system determines whether a seller is listing a vehicle. As discussed above, there are various indicators as to whether a seller is listing a vehicle, including whether an inspection report for the vehicle is input to the system. If the seller is listing the vehicle, at 904, the system determines, based on accessing the seller's preset preferences, whether one or more prices (such as the initial asking price and/or the floor price) are autogenerated. At 906, the system determines, based on the accessed preferences, whether to autogenerate one or more prices. If so, at 910, the system autogenerates one or more prices, including any one, any combination, or all of asking price (which may be equivalent to BIN), counter bids, timing when counter bids made, and floor price. If not, at 908, the system requests input from the seller. After which, at 912, the vehicle is listed.

As discussed above, the system may automatically generate and implement (with or without approval of the seller) one or more prices during the auction. For example, at 914, the system determines whether there have been any offers within a first predetermined time (e.g., 6 hours) since first listing the vehicle. If so, the BIN is reset. For example, if there are no offers within 6 hours of first listing the vehicle, the BIN is set to the target price. If yes, at 918, the system determines the elapsed time since the last bid. At 920, the system determines whether the elapsed time since the last bid is greater than a second predetermined time (e.g., 4 hours). If so, at 922, the system determines whether the current offer is greater than the target price. If so, at 924, the vehicle is sold at the current offer. If not (meaning that the current bid is lower than the target price and the elapsed time since the current bid is greater than the second predetermined time), at 926, the system sets the BIN to the target price. At 928, the system further determines the elapsed time since first listing the vehicle. At 930, the system determines whether the elapsed time since first listing the vehicle is greater than a third predetermined time (e.g., 3 days after first listing). If so, at 932, the system sets the BIN to the floor price if the highest offer is less than the floor price. If not, at 934, the system determines whether the BIN has been accepted. If so, at 936, the system sells the vehicle to the buyer who accepted the BIN. If not, the flow chart 900 loops back to 914.

Figure 10:
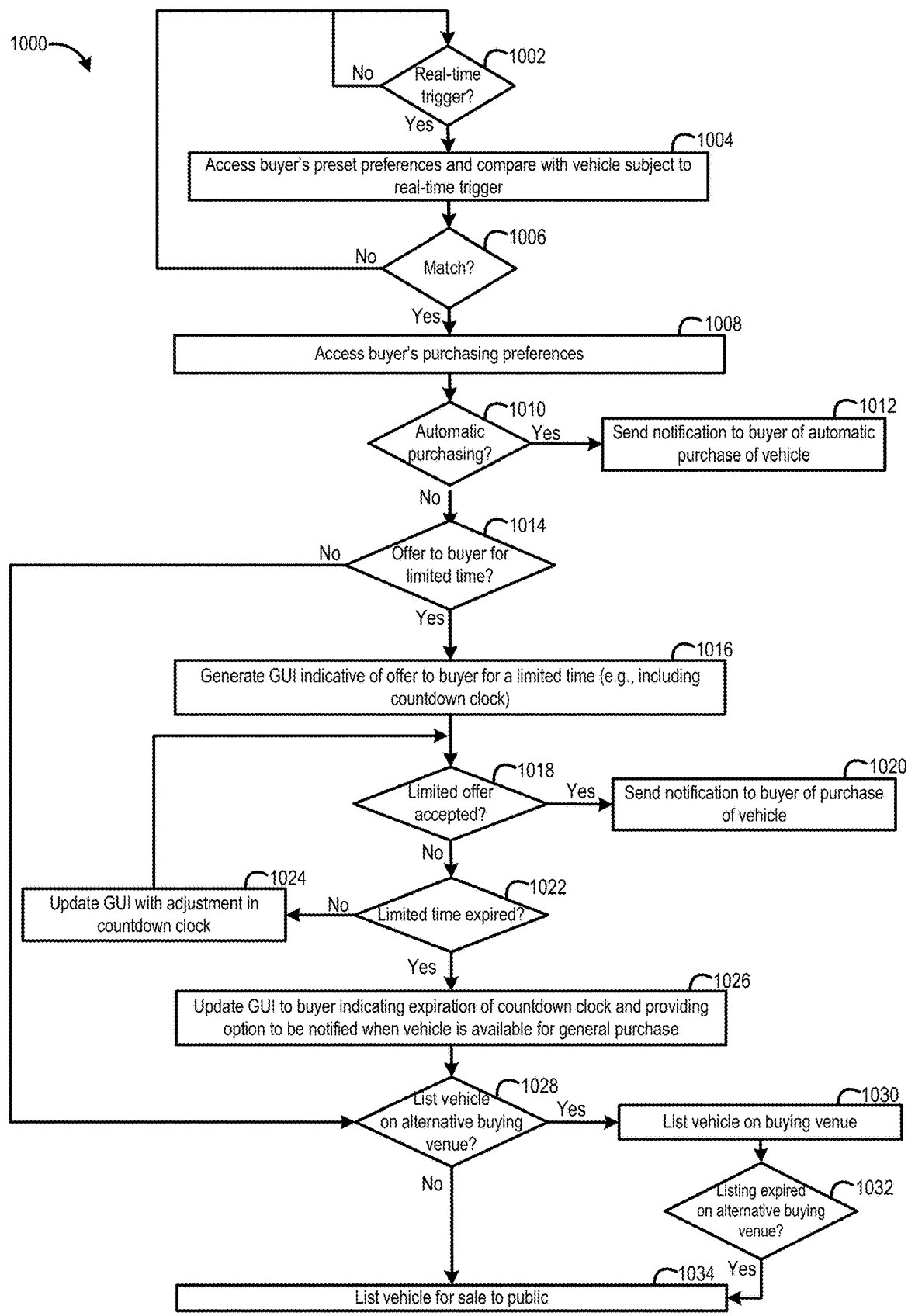
FIG. 10 is a third example flow chart in which a buyer is presented with a limited-time offer.

As discussed above, a buyer may be notified in real time responsive to the system determining that a vehicle matches one or more preferences. For example, FIG. 10 is a third example flow chart 1000 in which a buyer is presented with a limited-time offer. At 1002, the system determines whether there is a real-time trigger. Various real-time triggers are contemplated. As one example, the system, responsive to determining that a vehicle has been listed or responsive to determining that the vehicle is subject to a limited-time offer (see 824), may identify a real-time event. At 1004, the system accesses the buyer's preset preferences and compares the accessed preset preferences with the vehicle subject to the real-time trigger. At 1006, the system determines whether there is a match between the buyer's preset preferences and the attributes of the vehicle. For example, the buyer may have preset preferences of Ford trucks within a certain distance. See FIG. 13. If there is no match, flow chart 1000 loops back to 1002. If there is a match, at 1008, the system accesses the buyer's purchasing preferences. As discussed above, various purchasing preferences are contemplated, including any one, any combination, or all of: automatic purchasing (without any buyer input after configuring the preferences); or automatic notification and purchasing contingent on approval by the buyer. At 1010, the system determines whether the buyer has purchasing preferences for automatic purchasing. If so, at 1012, the system executes the automatic purchase and optionally sends a notification to the buyer of the automatic purchase of the vehicle. If not, at 1014, the system determines whether to offer the vehicle to the buyer for a limited-time purchase. As discussed above, the buyer may receive limited-time offers under certain circumstances. In the event the system determines to send the buyer a limited time offer, at 1016, the system generate one or more GUIs indicative of the offer to the buyer for a limited time. The one or more GUIs may also include a countdown clock indicating how much time is left to purchase the vehicle. At 1018, the system determines whether the limited offer was accepted. If so, at 2020, the system sends a notification to the buyer of the purchase. If not, at 1022, the system determines whether the limited time has expired. If the time has not expired, at 1024, the system updates the GUI with the adjustment in the countdown clock (e.g., indicating the time left in the limited-time offer). If yes, at 1026, the system updates the GUI indicating to the buyer that the countdown clock has expired and providing the buyer the option to be notified when the vehicle is available for general purchase.

At 1028, the system determines whether to list the vehicle on an alternative buying venue. As discussed above, the vehicle may be offered in different venues, such as via the ADESA platform or the Openlane platform. If not, at 1034, the vehicle is listed for sale to the public. If so, at 1030, the vehicle is listed on the buying venue. At 1032, the system determines whether listing has expired on the alternative buying venue. If so, flow chart 1000 goes to 1034.

Figure 11:
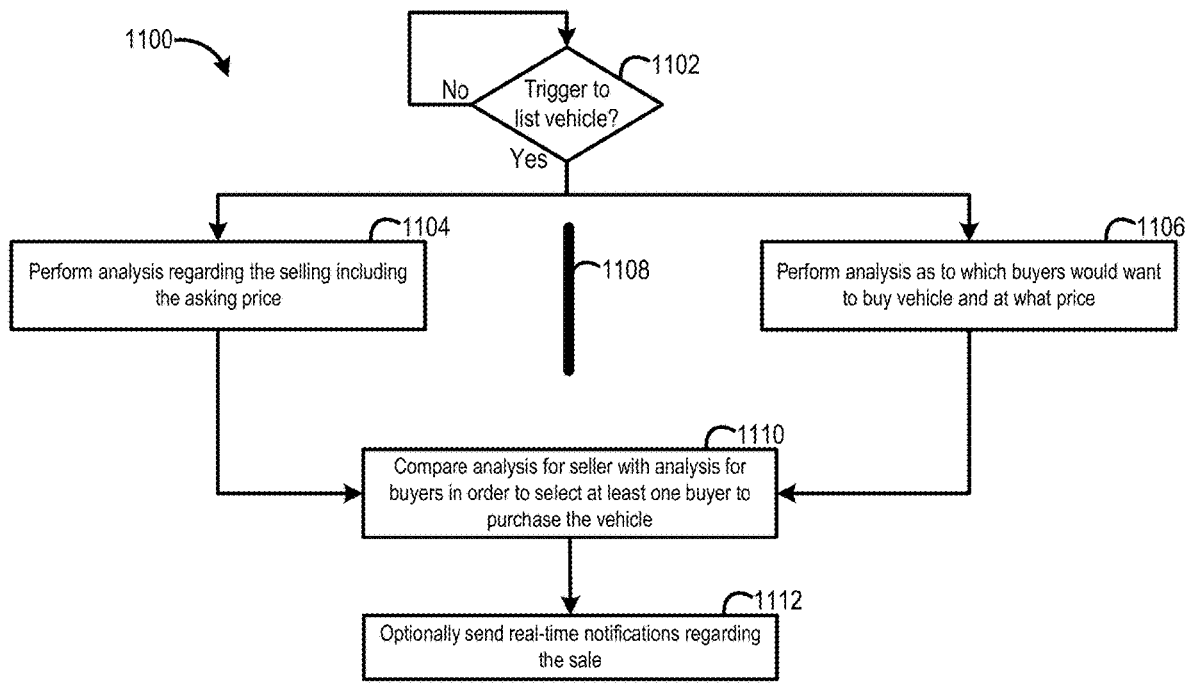
FIG. 11 is a fourth example flow chart in which automatic analysis on behalf of the seller and on behalf of the buyer are performed independently.

FIG. 11 is a fourth example flow chart 1100 in which automatic analysis on behalf of the seller and on behalf of the buyer are performed independently. As discussed above, the system may be configured to perform one or more automatic functions, with some or all of the automatic functions being independently executed. For example, the system may be composed of programmatic/automatic selling functionality and programmatic/automatic buying functionality, with each functionality being independently executed of one another. In particular, one independently executed portion of the methodology may automatically generate an asking price (on behalf of the seller) for a respective vehicle, and another independently executed portion of the methodology may automatically generate the buy price (on behalf of the buyer) for the respective vehicle. This is illustrated in FIG. 11. Specifically, at 1102, the system determines whether there is a trigger to list a vehicle. If so, at 1104, the system performs analysis regarding the selling of the vehicle, including generating the asking price. Further, at 1106, the system performs analysis as to which buyers would want to buy vehicle (e.g., based on input from the buyers themselves and/or based on analysis by the system of the activities of the buyer) and at what price the buyers wish to purchase the vehicle. The analysis at 1104 and the analysis at 1106 are independent of one another, as illustrated by line 1108.

At 1110, the analysis for seller (including the sale price) and the analysis for buyers (including the purchase price) are compared in order to select at least one buyer to purchase the vehicle. At 1112, the system may optionally send real-time notifications to one or both of the buyer or the seller regarding the sale.

For example, responsive to determining that the automatically generated sale price is less than the automatically generated purchase price, the system may execute the sale. In the instance where the programmatic/automatic buying functionality identifies a single buyer whose calculated purchase price is greater than the generated sale price, the system may select the single buyer for purchase. Further, in one embodiment, the system may select the price at which to purchase the vehicle to be the generated sale price. Alternatively, the system may select the price at which to purchase the vehicle to be the generated purchase price. Still alternatively, the system may select the price at which to purchase the vehicle to be in between the generated sale price and the generated purchase price (e.g., an average of the generated sale price and the generated purchase price).

In the instance where the programmatic/automatic buying functionality identifies multiple buyers whose calculated purchase price is greater than the generated sale price, the system may: (i) select which of the multiple buyers to select as the purchaser; and (ii) select the price at which to sell the vehicle. In one embodiment, the system may select the buyer, from the multiple buyers, whose generated purchase price is highest amongst the multiple buyers. Alternatively, the system may select the buyer, from the multiple buyers, whose history indicates the buyer is more interested in purchase the type of vehicle subject to the sale.

Figure 12:
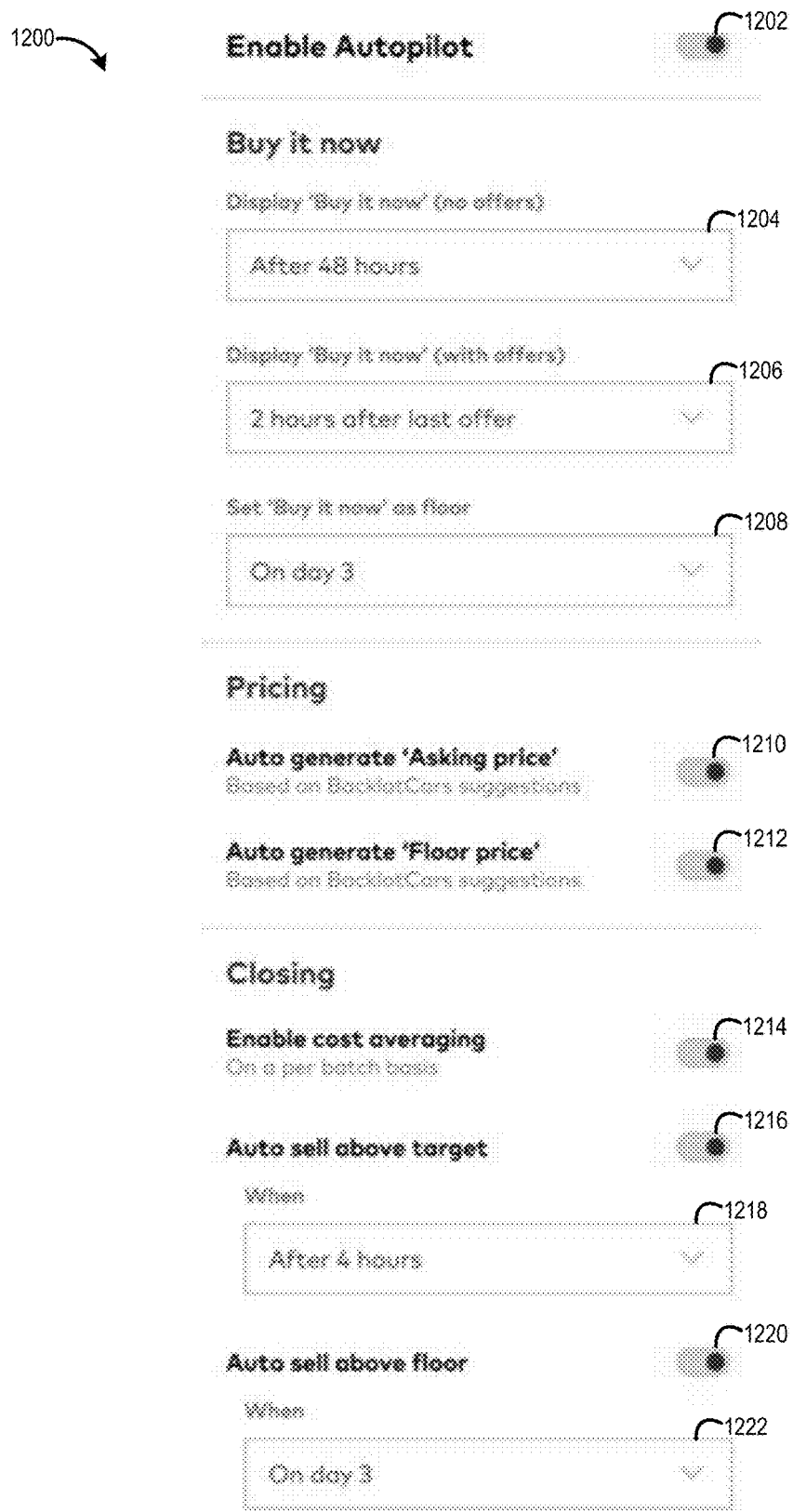
FIG. 12 is a first example graphical user interface (GUI) in which a seller may instruct the system to perform one or more automatic operations.

FIG. 12 is a first example graphical user interface (GUI) 1200 in which a seller may instruct the system to perform one or more automatic operations. As discussed above, Autopilot enables the configuration of automatic features for one or more stages associated with the sale of the vehicle, such as prior to the sale of the vehicle (e.g., automatically setting initial asking price and/or initial purchase price), during the sale of the vehicle (e.g., automatically setting counter-offers for the seller and/or the buyer; automatically setting the timing as to sending the counter-offers; automatically sending notifications); at the closing of the sale of the vehicle (e.g., automatically determining when to close the auction; automatically determining under what terms to close the auction; etc.). In this way, Autopilot enables a respective seller or a respective buyer to tailor the automatic features, including when enabling Autopilot 1202.

As one example, on the seller side, the system may automatically generate including initial prices (e.g., the asking price and/or the floor price), and may then immediately use the initial prices (e.g., for programmatic/automatic buying or for the asking price when listing the vehicle on the website) or may use the initial prices only responsive to seller approval (e.g., the system may send, in real-time or near real-time the automatically generated initial prices and await approval from the seller). As another example, on the buyer side, the system may automatically generate purchase prices at which to purchase vehicles. Again, the system may immediately implement the automatically generated purchase prices (e.g., such as for programmatic/automatic buying, discussed further below) or may use the automatically generated purchase prices only responsive to buyer approval.

Further, as shown in FIG. 12, the seller may configure the circumstances when to automatically modify a BIN under various circumstances, including when no offers have been received (see 1204 enabling configuration of a time period, selected from a plurality of potential time periods in a pull down menu, in which to modify BIN after 48 hours with no offers), when offers have been received (see 1206 enabling configuration of a time period, selected from a plurality of potential time periods in a pull down menu, in which to modify BIN after 2 hours since the last offer); or when the BIN is set to the floor price (see 1208 enabling configuration of a time period, selected from a plurality of potential time periods in a pull down menu, in which to modify BIN to the floor price three days after initial listing if the highest offer is less than the floor price). Alternatively, or in addition, separate from automatically setting the BIN, Autopilot may enable the seller to configure automation of one or more negotiation aspects, including what and/or when to counter-offer.

Likewise, Autopilot enables a seller to configure whether to autogenerate one or more prices associated with the auction, including the asking price (see 1210) and/or the floor price (see 1212). Finally, Autopilot may enable the seller to configure one or more automatic aspects regarding closing, including whether to enable cost averaging (see 1214), enabling when to auto sell above the target price (see 1216, which enables the seller to select the predetermined time, from a drop down menu 1218 of a plurality of times, in which to sell the vehicle when the current bid is above the target price), and/or enabling when to auto sell above the floor price (see 1220, which enables the seller to select the predetermined time, from a drop down menu 1222 of a plurality of times, in which to sell the vehicle when the current bid is above the floor price).

As one example, Autopilot may enable cost averaging (see 1214). In particular, in one embodiment, the determination whether to close may only consider bids in the present auction. Alternatively, the determination whether to close may consider multiple auctions, such as cost averaging. For example, Autopilot controls for cost averaging for a "batch" or grouping of cars enables a seller to choose to allow the autopilot controls to optimize the price determination across multiple vehicles, such as all vehicles in a designated group of listings in order to bring an aggregate price amount. Merely by way of example, if a respective seller has 3 listings with floor amounts of $1,000, $1,500, and $2,000, and with respective seller seeking to achieve a result of $4,000 on that "batch" of vehicles, the cost averaging feature, when enabled, allowing Autopilot to sell one or some of the vehicles below the floor price as long as the aggregate of $4,000 is achieved. In this way, Autopilot, through its one or more GUIs, enables the seller to tailor the automatic features to the seller's liking.

Though not illustrated in FIG. 12, Autopilot enables the seller to instruct fully automatic mode for one or more tasks (e.g., in which Autopilot automatically performs one or more tasks, such as generating prices, and uses the results of the tasks, such as uses the generated prices in the auction) or partial automatic mode for one or more tasks (e.g., in which Autopilot automatically performs one or more tasks, such as generating prices, and request authorization from the seller (such as via a GUI) prior to using the results of the tasks, such as using the generated prices in the auction). In this regard, for certain tasks such as Pricing (see autogenerating asking price at 1210 or autogenerating floor price at 1212), the seller may be provided the option for fully automatic mode or partial automatic mode.

Similar to FIG. 12, the buyer may be provided with one or more GUIs in which to configure Autopilot. As discussed above, Autopilot may generate one or more prices, such as bid prices, counter-offer prices and the like. In this regard, the one or more GUIs may enable the buyer to auto generate the bid price, the maximum price, the timing of counter offers, or the like. Further, in one or some embodiments, the one or more GUIs may enable the buyer to configure for fully automatic mode or partial automatic mode.

FIG. 13 is a second example GUI 1300 in which a buyer is presented with limited-time offers for vehicles. As discussed above, the buyer may be notified regarding vehicles of interest (either by the system gleaning which vehicles may be of interest and/or by the respective buyer input one or more features of vehicles of interest). FIG. 13. illustrates two different groupings of vehicles of interest including Ford Trucks Near Me 1302 (with attributes of make=Ford; type of vehicle=Truck; and location=near me (e.g., less than 50 miles away from buyer)) and BIN Vans>150K Miles 1304 (with attributes of type of price=BIN; type of vehicle=Van; and mileage=greater than 150K miles). Further, the GUI may list one or more vehicles that match the features for the grouping(s). For example, FIG. 13 illustrates two vehicles that match the grouping Ford Trucks near Me 1310, with a first vehicle 1320 and a second vehicle 1330 shown with relevant details. Further, associated with the listing of the vehicles are countdown clocks 1322, 1332, which indicate to the buyer the amount of time left to purchase, and an associated Buy Now icon 1324, 1334. As shown in FIG. 13 and described above, the countdown clocks may vary for the different vehicles listed, which may depend on the trigger when the buyer was notified. In particular, various triggers are contemplated to enable real-time or near real-time notifications to the buyer. Triggers may be associated with the seller and/or the vehicle of the seller (e.g., input of inspection for vehicle) and/or may be associated with the buyer (e.g., buyer action such a real-time input indicating an interest in a certain type of vehicle, such as a bid for the certain type of vehicle). In this way, the one or more GUIs may be tailored to the buyer and may include real-time indications, such as countdown clocks.

Although the invention has been described with reference to the embodiments illustrated in the attached drawing figures, it is noted that equivalents may be employed and substitutions made herein without departing from the scope of the invention.

The invention claimed is:

1. A method of configuring automatic operation with input from a seller and for subsequent at least partly automatic selling of a plurality of vehicles for sale, the method comprising:

generating one or more seller graphical user interfaces (GUIs) in order to solicit seller input from the seller for configuring automatic operation: (i) at a beginning of an auction for the plurality of vehicles including automatically generating an initial price; and (ii) during the auction for automatically performing whether to counter-offer or how much to counter-offer in response to a buyer bid;

for each of the plurality of vehicles:
  receiving a triggering event, the triggering event indicative of at least one process associated with the sale of a respective vehicle of the plurality of vehicles; and
  responsive to the triggering event and in real time:
    automatically generating, based on the seller input previously solicited via the one or more seller GUIs, the initial price for the respective vehicle;
    accessing information indicative of one or more vehicle factors of interest to one or more buyers and to the seller;
    determining, based on the accessed information, a respective buyer whose associated one or more vehicle factors matches one or more factors associated with the respective vehicle;
    responsive to determining that the respective buyer whose associated one or more vehicle factors matches the one or more factors associated with the respective vehicle, in real time, receiving a buyer bid for the respective vehicle;
    automatically determining, based the seller input previously solicited via the one or more seller GUIs, whether to counter-offer the buyer bid of the respective buyer; and
    responsive to automatically determining to counter-offer the buyer bid of the respective buyer, automatically generating a counter-bid to the buyer bid, wherein at least one computing device performs:
  (i) automatically generating, based on the seller input previously solicited via the one or more seller GUIs, the initial price for the respective vehicle;
  (ii) automatically determining, based the seller input previously solicited via the one or more seller GUIs, whether to counter-offer the buyer bid of the respective buyer; and
  (determining, based on the accessed information, the respective buyer whose associated one or more vehicle factors matches one or more factors associated with the respective vehicle; and wherein the at least one computing device performs (i) and (ii) independently of (iii); and wherein machine learning is used in at least one aspect of the method.

2. The method of claim 1, wherein a first triggering event received at a first time is associated with a first vehicle, the first vehicle has the associated one or more vehicle factors matched to the respective buyer;

wherein a second triggering event received at a second time is associated with a second vehicle, the second vehicle has the associated one or more vehicle factors matched to the respective buyer;

wherein one or more GUIs sent to the respective buyer list both the first vehicle with an associated first limited time indication and the second vehicle with an associated second limited time indication; and wherein the first limited time indication is different from the second limited time indication.

3. The method of claim 2, wherein the first vehicle with the associated first limited time indication and the second vehicle with the associated second limited time indication are displayed on a single GUI;

wherein the first limited time indication comprises a first countdown clock; and wherein the second limited time indication comprises a second countdown clock.

4. The method of claim 1, further comprising:

prior to sending one or more GUIs to the respective buyer and responsive to determining the respective buyer whose associated one or more vehicle factors matches the one or more factors associated with the respective vehicle, determining, based on a prior configuration by the respective buyer, whether to automatically sell the respective vehicle to the respective buyer; and responsive to determining not to automatically sell the respective vehicle to the respective buyer, sending the one or more GUIs to the respective buyer, the one or more GUIs further including an indication of a limited time in which to purchase the respective vehicle.

5. The method of claim 4, wherein the prior configuration by the respective buyer comprises automatically purchasing, in a defined period, a predetermined number of vehicles or a total value of vehicles that match the one or more vehicle factors associated with the respective buyer;
- responsive to determining that the respective vehicle matches the one or more vehicle factors associated with the respective buyer and to determining that purchasing the respective vehicle does not exceed the predetermined number of vehicles or the total value of vehicles in the defined period, automatically purchasing the respective vehicle; and
- responsive to determining that the respective vehicle matches the one or more vehicle factors associated with the respective buyer and to determining that purchasing the respective vehicle exceeds the predetermined number of vehicles or the total value of vehicles in the defined period, sending the one or more GUIs to the respective buyer comprising an indication of a plurality of attributes of the respective vehicle, an indication of the associated one or more vehicle factors, and the indication of the limited time in which to purchase the respective vehicle.

6. The method of claim 1, further comprising providing automatic price recommendations to the seller based on at least one of a current market price, potential profit, a time-to-sale, vehicle inspection information, a transportation cost, elapsed time since the respective vehicle was first listed, elapsed time since the respective vehicle was last relisted, number of times the respective vehicle has been relisted;
- wherein the automatic price recommendations to the seller being independent of an initial purchase price for the respective buyer.

7. A system for configuring and at least partly automatic selling of a plurality of vehicles, the system comprising:
- a memory; and
- at least one processor, the at least one processor is in communication with the memory, is configured to use machine learning, and is configured to:
  - generate and send one or more seller graphical user interfaces (GUIs) for transmission to a seller, the one or more seller GUIs indicative of soliciting seller input from the seller in configuring automatic operation: (i) at a beginning of an auction for the plurality of vehicles including automatically generating an initial price; and (ii) during the auction for automatically performing whether to counter-offer or how much to counter-offer in response to a buyer bid;
  - responsive to sending the one or more seller GUIs, receive input regarding configuring automatic operation: (i) at the beginning of the auction for the plurality of vehicles including automatically generating the initial price; and (ii) during the auction for automatically performing whether to counter-offer or how much to counter-offer in response to the buyer bid;
  - for each of the plurality of vehicles:
    - receive a triggering event, the triggering event indicative of at least one process associated with a sale of a respective vehicle of the plurality of vehicles; and
    - responsive to receiving the triggering event and in real-time:
      - automatically generate, based on the seller input previously solicited via the one or more seller GUIs, the initial price for the respective vehicle;
      - access information indicative of one or more vehicle factors of interest to one or more buyers and to the seller;
      - determine, based on the accessed information, a respective buyer whose associated one or more vehicle factors matches one or more factors associated with the respective vehicle;
      - responsive to determining that the respective buyer whose associated one or more vehicle factors matches the one or more factors associated with the respective vehicle, in real time, receive a buyer bid for the respective vehicle;
      - automatically determine, based the seller input previously solicited via the one or more seller GUIs, whether to counter-offer the buyer bid of the respective buyer; and
      - responsive to automatically determining to counter-offer the buyer bid of the respective buyer, automatically generate a counter-bid to the buyer bid;
  - wherein the at least one processor is configured to automatically generate the initial price for the respective vehicle and to automatically determine whether to counter-offer the buyer bid independently of automatically determining the respective buyer.

8. The system of claim 7, wherein the at least one processor is further configured to generate one or more buyer GUIs by:
- generating the one or more buyer GUIs for transmission to the respective buyer, the one or more buyer GUIs indicative of programmatic buying directed to at least one or more aspects related to price of the respective vehicle;
- wherein the at least one processor is configured to receive input by:
- responsive to sending to the respective buyer the one or more buyer GUIs, receive automatic configuration data indicative of the one or more aspects related to purchasing of vehicles;
- wherein the at least one processor, responsive to receiving the triggering event, is configured to:
- generate, on behalf of the respective buyer, an initial purchase price for the respective vehicle, wherein the generating of the initial purchase price is independent of the generating of the initial price automatically generated based on the seller input; and
- automatically determining whether to execute the sale of the respective vehicle based on the initial price and the initial purchase price of the respective vehicle.

9. The system of claim 7, wherein the one or more seller GUIs are configured to solicit input from the seller in configuring automatic operation for closing the auction;
- wherein the at least one processor is further configured to:
  - generate and send one or more buyer GUIs for transmission to the respective buyer, the one or more buyer GUIs indicative of soliciting input from the respective buyer in configuring automatic operation at the beginning of the auction and during the auction;
  - responsive to sending the one or more buyer GUIs, receive buyer input regarding configuring automatic operation at the beginning of the auction and during the auction;
  - responsive to receiving the triggering event:
    - perform the automatic operation on behalf of the seller at the beginning of the auction, during the auction, and closing the auction; and perform the automatic operation on behalf of the respective buyer at the beginning of the auction and during the auction.

10. The system of claim 9, wherein the at least one processor is configured to perform the automatic operation on behalf of the seller at the beginning of the auction by automatically generating one or both of a floor price indicative of a minimum price at which the seller accepts the sale or an initial ask price indicative of an initial price at opening of the auction at which the seller accepts the sale without counteroffer;

wherein the at least one processor is configured to perform the automatic operation on behalf of the respective buyer at the beginning of the auction by automatically generating one or both of a max price indicative of a maximum price at which the respective buyer will bid during the auction or an initial bid price indicative of a first bid by the respective buyer at the auction; and wherein the at least one processor is configured to automatically generate the one or both of the max price or the initial bid price independently of automatically generating the one or both of the floor price or the initial ask price.

11. The system of claim 10, wherein responsive to the at least one processor automatically generating the one or both of the floor price or the initial ask price, the at least one processor is configured to transmit to the seller a GUI indicative of requesting approval prior to use by the system in selling the respective vehicle.

12. The system of claim 10, wherein responsive to the at least one processor automatically generating the one or both of the floor price or the initial ask price, the at least one processor is configured to automatically use the one or both of the floor price or the initial ask price without prior approval by the seller.

13. The system of claim 10, wherein the at least one processor is configured to perform the automatic operation on behalf of the seller during the auction by automatically generating a counteroffer of the seller in response to a bid submitted by the respective buyer and by automatically suggesting a timing for sending the counteroffer of the seller to the respective buyer; or wherein the at least one processor is configured to perform the automatic operation on behalf of the respective buyer during the auction by automatically generating a counteroffer of the respective buyer in response to a bid submitted by the seller and by automatically suggesting a timing for sending the counteroffer of the respective buyer to the seller.

14. The system of claim 10, wherein the at least one processor is configured to:

receive input from the respective buyer indicative of a maximum amount of automatic purchasing in a predetermined period, the maximum amount of automatic purchasing indicative of a maximum number of vehicles automatically purchased in the predetermined period or a maximum total value of vehicles automatically purchased in the predetermined period;

responsive to receiving the input, the at least one processor is configured to:

automatically purchase, without buyer input in the predetermined period, at least one of the maximum number of vehicles or maximum total value of vehicles; and after automatically purchasing, without buyer input in the predetermined period, the at least one of the maximum number of vehicles or maximum total value of vehicles, for a remainder of the predetermined period, send a request for buyer input to purchase vehicles.

15. The system of claim 10, wherein prior to or after closing of the auction, the at least one processor is configured to:

automatically select a subset of buyers; and automatically send the subset of buyers a limited-time offer to purchase the respective vehicle.

16. The method of claim 1, wherein the seller input comprises a conversion rate at which the plurality of vehicles are sold; and wherein automatically generating the counter-offer or a timing of automatically generating the counter-offer are determined based on the conversion rate provided by the seller.

17. The method of claim 1, where the one or more seller GUIs further solicit the seller input from the seller for configuring automatic operation of: (iii) a closing of the auction; and further comprising automatically determining, based the seller input previously solicited via the one or more seller GUIs, whether to automatically close the auction.

18. The method of claim 17, further comprising:

generating one or more buyer GUIs in order to solicit buyer input from the respective buyer for configuring automatic operation generating the buyer bid from the respective buyer.

19. The method of claim 18, wherein automatic analysis on behalf of the seller and on behalf of the respective buyer are performed independently.

20. The method of claim 1, wherein the at least one computing device automatically generates a buy price on behalf of the respective buyer independently of automatically determining whether to accept the buy price on behalf of the seller.

21. The method of claim 20, wherein, responsive to determining not to automatically accept the buy price on behalf of the seller, the at least one computing device automatically generates a counter-offer on behalf of the seller independently of automatically determining whether to accept the counter-offer on behalf of the respective buyer.

22. The method of claim 21, wherein the at least one computing device determines whether to accept the counter-offer on behalf of the respective buyer or to generate another counter-offer on behalf of the respective buyer for the respective vehicle independently of determining whether to automatically accept the another counter-offer on behalf of the seller.

* * * * *

UNITED STATES PATENT AND TRADEMARK OFFICE
CERTIFICATE OF CORRECTION

PATENT NO. : 12,182,840 B2
APPLICATION NO. : 17/400539
DATED : December 31, 2024
INVENTOR(S) : David Horen, Daniel Duncan and Jason Houseworth It is certified that error appears in the above-identified patent and that said Letters Patent is hereby corrected as shown below:

In the Claims (Claim 1; Column 42; Line 24-31):
"(ii) automatically determining, based the seller input previously solicited via the one or more seller GUIs, whether to counter-offer the buyer bid of the respective buyer; and
(determining, based on the accessed information, the respective buyer whose associated one or more vehicle factors matches one or more factors associated with the respective vehicle; and
wherein the at least one computing device performs (i) and (ii) independently of (iii)."

Should be replaced with:
"(ii) automatically determining, based the seller input previously solicited via the one or more seller GUIs, whether to counter-offer the buyer bid of the respective buyer; and
(iii) determining, based on the accessed information, the respective buyer whose associated one or more vehicle factors matches one or more factors associated with the respective vehicle; and
wherein the at least one computing device performs (i) and (ii) independently of (iii)."

Signed and Sealed this
Twenty-fifth Day of February, 2025

Coke Morgan Stewart
*Acting Director of the United States Patent and Trademark Office*